US007175177B2

(12) United States Patent
Meifu et al.

(10) Patent No.: US 7,175,177 B2
(45) Date of Patent: Feb. 13, 2007

(54) GOLF DATA MANAGEMENT SYSTEM, DATA CENTER, AND METHOD OF MANAGING GOLF DATA

(75) Inventors: Yoshinobu Meifu, Kawasaki (JP); Keiji Mizuma, Kawasaki (JP); Hiroshi Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 957 days.

(21) Appl. No.: 09/779,278

(22) Filed: Feb. 8, 2001

(65) Prior Publication Data

US 2002/0004723 A1    Jan. 10, 2002

(30) Foreign Application Priority Data

Jul. 5, 2000    (JP) ............................ 2000-203183

(51) Int. Cl.
*G01S 5/14* (2006.01)
*A63B 71/06* (2006.01)
*G06F 155/00* (2006.01)
*H04M 1/00* (2006.01)

(52) U.S. Cl. ...................... 273/32; 367/410; 367/453; 705/1; 705/5; 700/91; 455/567; 455/557; 455/550.1; 455/41.2

(58) Field of Classification Search .................. 273/32; 367/410, 453; 455/567, 557
See application file for complete search history.

(56) References Cited

U.S. PATENT DOCUMENTS 5,245,537 A * 9/1993 Barber ........................ 473/403
5,507,485 A * 4/1996 Fisher ........................ 473/407

FOREIGN PATENT DOCUMENTS

| JP | 06015022 | 1/1994 |
| JP | 07134042 | 5/1995 |
| JP | 07193643 | 7/1995 |
| JP | 09276458 | 10/1997 |

* cited by examiner

*Primary Examiner*—John G. Weiss
*Assistant Examiner*—Matthew L. Brooks
(74) *Attorney, Agent, or Firm*—Katten Muchin Rosenman LLP

(57) ABSTRACT

The present invention relates to a golf data management system that stores and manages golf score data, and to a data center and a golf data management method. This golf data management system includes a portable communication terminal that is carried by a player and a data center connected to the portable communication terminal via a communication network. The data center includes: an individual data storage unit that stores and manages play data supplied from the portable communication unit and practice data supplied from a practice data processing unit; a group data storage unit that manages performances of a group of accompanying players; and a common data storage unit that stores course map data of a plurality of golf courses. In response to an advice request containing measurement data obtained by a measuring unit in the portable communication terminal, the data center provides advice for each individual player based on the data stored in the individual data storage unit.

13 Claims, 15 Drawing Sheets

FIG.8
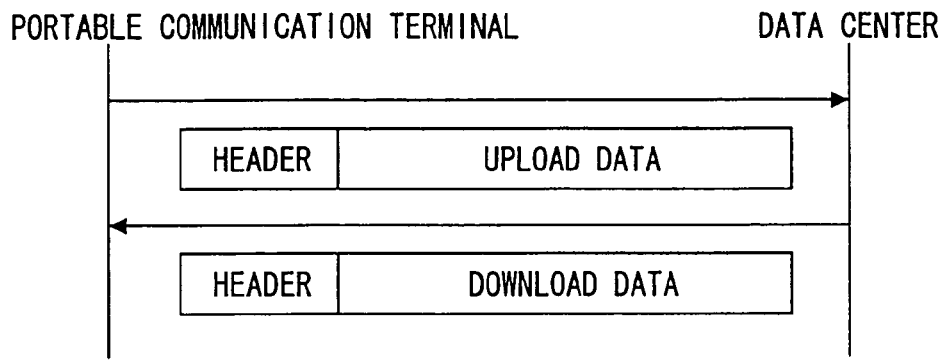
(1) UPLOAD HEADER
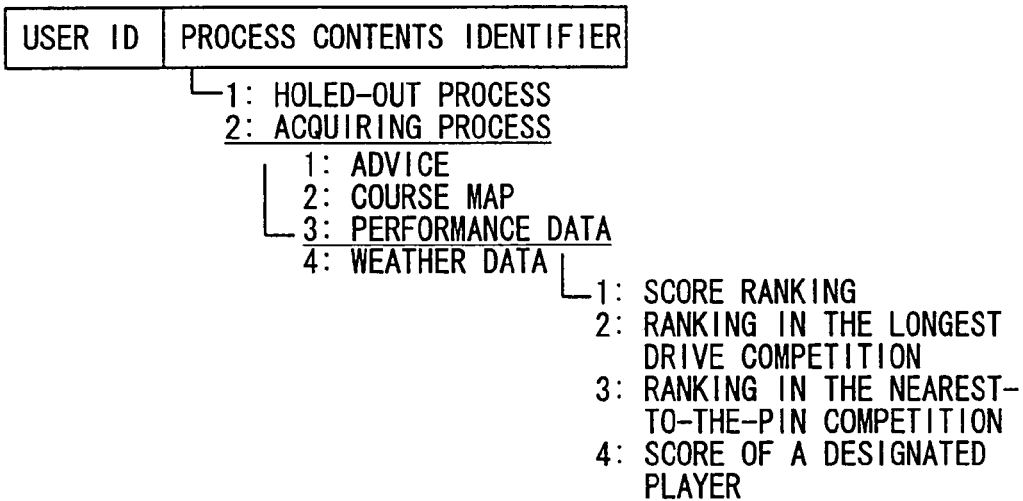
(2) DOWNLOAD HEADER
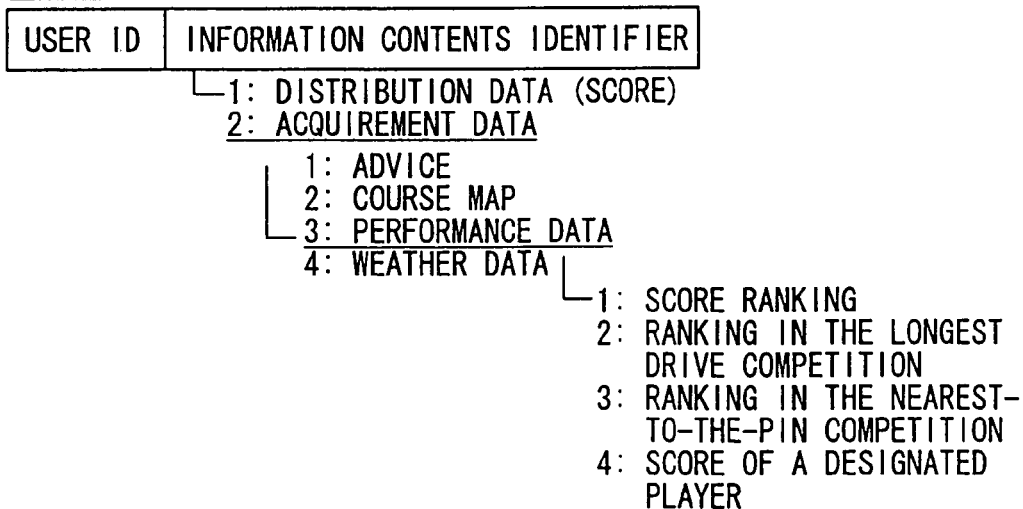

FIG.11
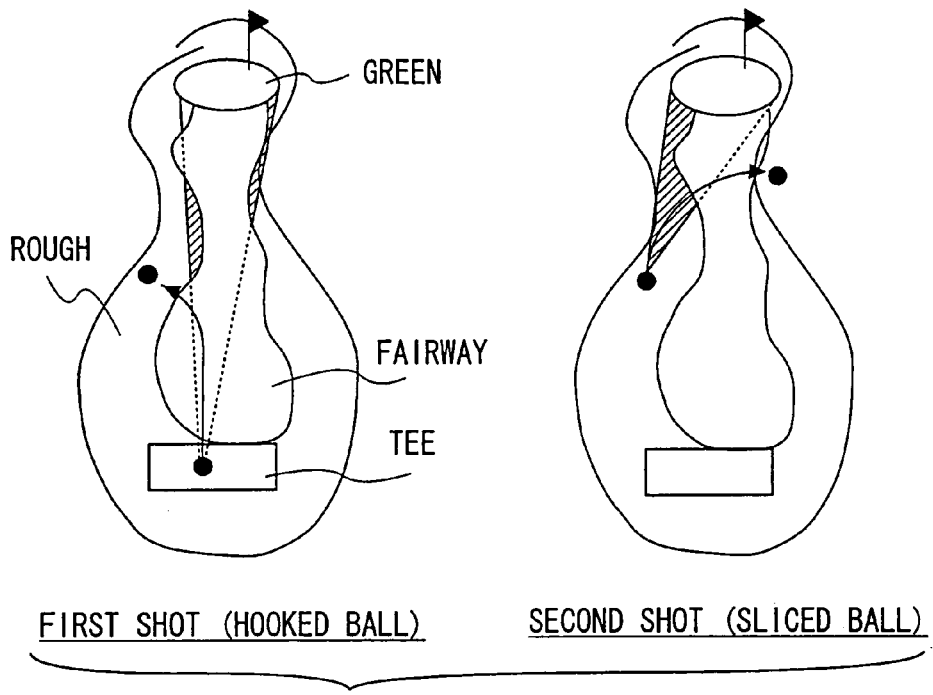
FIRST SHOT (HOOKED BALL)    SECOND SHOT (SLICED BALL)
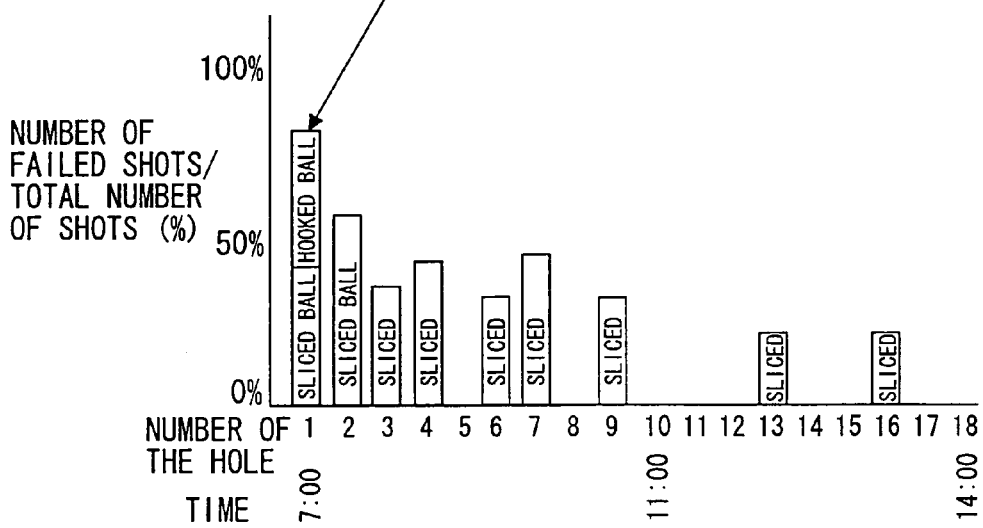

GOLF DATA MANAGEMENT SYSTEM, DATA CENTER, AND METHOD OF MANAGING GOLF DATA

BACKGROUND OF THE INVENTION

1. Field of the Invention

The present invention generally relates to golf data management systems, data centers, and golf data management methods. More particularly, the present invention relates to a golf data management system that includes a portable communication terminal that can transmit data to and receive data from a data center via a communication network. The present invention also relates to a data center that manages individual data on the play of each player and course map data of golf courses, and provides each individual player with advice. The present invention further relates to a method of managing various kinds of data concerning the play of each player.

2. Description of the Related Art

In a recording process on a golf course, each individual player writes on a score card and keeps the scores of accompanying players every time the player has holed out. Further, the types of clubs used might be recorded. After the completion of one round, each player tabulates the score. Such a hand-writing process can be replaced by a recording system using buttons.

For instance, a master station that includes a radio transceiver device and a computer is employed at a golf course. The master station is provided with a line wire connection unit for making connection with a public telephone line. A player or a caddie carries a portable terminal device that can have radio communication with the master station. This terminal device is provided with a measuring unit, so that location data, as well as score data, can be transmitted to the master station, and tabulated in the master station. The tabulation results are then transmitted to the portable terminal device. The above system is disclosed in Japanese Patent No. 2581491 and Japanese Laid-Open Patent Application No. 7-193643, for instance.

In another example of the prior art, a portable terminal device is equipped with a measuring unit of the GPS (Global Positioning System), a display unit, and various input buttons. Using the input buttons, shots and penalties are inputted, and the location information obtained by the measuring unit is added to the input data. At the end of a round, the data is tabulated and displayed. When record data is inputted into the computer, the score and the shot or putt paths of each hole can be displayed. Such a system is disclosed in Japanese Laid-Open Patent Application No. 6-15022.

As a play support means for each player, layout information may be stored in a terminal device, and the layout of a hole selected by the player is displayed. Also, a measuring unit is employed to measure and display the remaining distance from the current position to the green. Such a system is disclosed in Japanese Laid-Open Patent Application No. 7-134042.

Also, a terminal device that displays the current position determined by the measuring unit of the GPS on the layout image of the course, and the remaining distance to the green, is mounted on a golf cart. When making a shot, the player refers to the displayed data on the terminal device. A master station is employed in a club house, and receives information from the terminal device. Thus, data on the performance of each player is obtained by the master station. Such a system is disclosed in Japanese Laid-Open Patent Application No. 9-276458.

Advice during a game on a golf course is normally given by a caddie. However, since an amateur golfer cannot afford his or her own caddie, the advice he/she receives may be just a general opinion. Also, the advice given by the conventional terminal device based on the remaining distance to the green and the type of the grass on the green is a general opinion. So, each individual player cannot receive sufficient advice based on their own conditions.

Also, the score of each individual player is not stored, unless the player participates in a big competition. Furthermore, one player often plays in a plurality of golf courses. Therefore, the play data of each player needs to be written on a score card or inputted into a computer, so that the data can be used for future games. However, the storing and management of a large amount of play data are often very complicated. Also, there is data that is rarely recorded, such as shot distance data of each club in a practice field. This leads to a problem that practice results cannot be fed back during an actual game.

SUMMARY OF THE INVENTION

A general object of the present invention is to provide golf data management systems in which the above disadvantages are eliminated.

A more specific object of the present invention is to provide a golf data management system that manages golf data including individual practice data in a data center so that each individual player can refer to past and current golf data, and provides advice on shots and putts.

The above objects of the present invention are achieved by a golf data management system that comprises: a portable communication terminal; and a data center that transmits data to and receives data from the portable communication system via a communication network. In this golf data management system, the portable communication system comprises:

a recording unit that records play data including a score and measurement data obtained by measuring a position of a shot or a putt by a measuring unit;

a transmission unit that adds an individual identification number of a player who carries the portable communication terminal to the play data recorded by the recording unit, and transmits the play data to the data center via the communication network after holing out of each hole; and a display unit that stores the data transmitted from the data center via the communication network, and displays the stored data.

The data center comprises:

an individual data storage unit that stores and manages practice result data and the play data corresponding to the individual identification number in accordance with each golf course and each play date;

a common data storage unit that stores course map data of a plurality of golf courses; and an output unit that outputs the play data stored in the individual data storage unit in response to a request from the portable communication terminal.

The above objects of the present invention are also achieved by a data center that transmits data to and receives data from a portable communication terminal via a communication network. This data center comprises:

an individual data storage unit that stores play data accompanied by an individual identification number of a player and practice data;

a common data storage unit that stores course map data of a plurality of golf courses;

a group data storage unit that manages data of a group of accompanying players; and a data analysis unit that produces and outputs, in response to an advice request, advice on a shot or a putt for the individual player at a current location, based on individual data stored in the individual data storage unit, the course map data stored in the common data storage unit, and measurement data supplied from the portable communication terminal.

The above objects of the present invention are also achieved by a method of managing golf data of each individual player that is transmitted between a portable communication terminal and a data center via a communication network. This method includes the steps of:

storing course map data of a plurality of golf courses in a common data storage unit;

receiving play data, including measurement data and a score, provided with an individual identification number supplied from the portable communication terminal, or practice data provided with the individual identification number;

storing and managing the received data in an area corresponding to the individual identification number in an individual data storage unit;

reading out the course map data from the common data storage unit or the play data corresponding to the individual identification number from the individual data storage unit, in response to a course map data request or a play data request provided with the individual identification number supplied from the portable communication terminal; and transmitting the read-out course map data or the play data to the portable communication terminal.

The above and other objects and features of the present invention will become more apparent from the following description taken in conjunction with the accompanying drawings.

BRIEF DESCRIPTION OF THE DRAWINGS

FIG. 8 shows data formats in accordance with the present invention;

FIG. 11 illustrates play analysis in accordance with the present invention;

DESCRIPTION OF THE PREFERRED EMBODIMENTS

The following is a description of embodiments of the present invention, with reference to the accompanying drawings.

Figure 1:
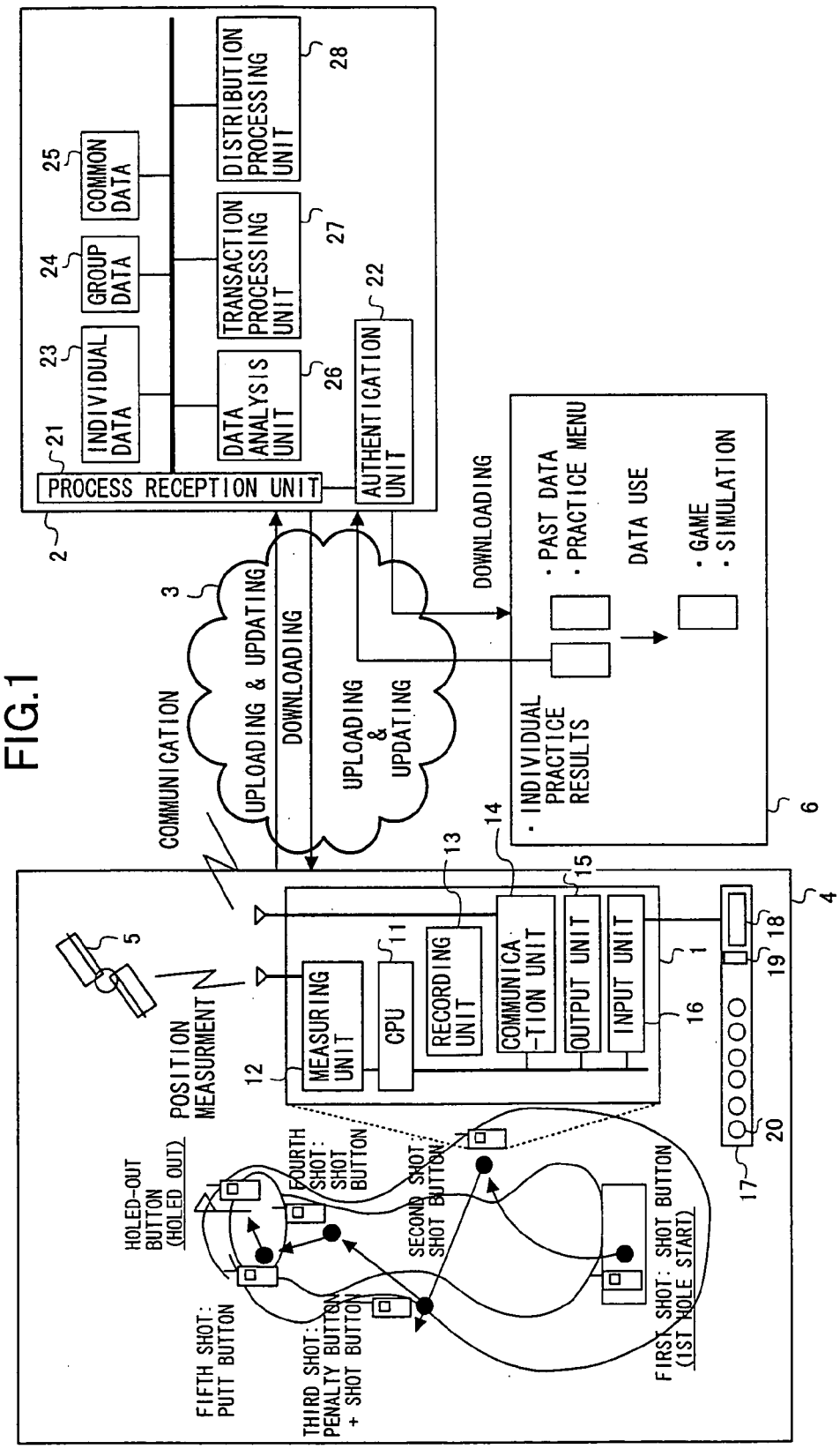
FIG. 1 illustrates one embodiment of the present invention.

FIG. 1 shows a golf data management system that comprises a portable communication terminal 1, a data center 2, and a communication network 3. In FIG. 1, reference numeral 4 indicates a golf course, reference numeral 5 indicates a communication satellite for the GPS (Global Positioning System), reference numeral 6 indicates a data processing unit, reference numeral 11 indicates a processor (CPU), reference numeral 12 indicates a position measuring unit, reference numeral 13 indicates a recording unit, reference numeral 14 indicates a communication unit, reference numeral 15 indicates an output unit, reference numeral 16 indicates an input unit, reference numeral 17 indicates an input device, reference numeral 18 indicates a simple display unit, reference numeral 19 indicates a select switch, and reference numeral 20 indicates input buttons. In the data center 2, reference numeral 21 indicates a process reception unit, reference numeral 22 indicates an authentication unit, reference numeral 23 indicates an individual data storage unit, reference numeral 24 indicates a group data storage unit, reference numeral 25 indicates a common data storage unit, reference numeral 26 indicates a data analysis unit, reference numeral 27 indicates a transaction processing unit, and reference numeral 28 indicates a distribution processing unit.

The portable communication terminal 1 is carried by a player, and comprises: the processor 11 which controls each component; the position measuring unit 12 which detects the current position; the recording unit 13 which records position measuring data indicating the current position and play data, and stores reception data from the data center 2; the communication unit 14 which communicates with the data center 2; the output unit 15 which includes a display such as a liquid crystal panel for indicating characters and figures, an audio output unit, and an interface for outputting data; and the input unit 16 which is provided with function buttons and dial buttons (not shown), and receives data from the outside. This portable communication terminal 1 can be made especially for golf data. However, since the portable communication terminal 1 has the same communication functions as a portable telephone or a PHS (Personal Handy-phone Service) telephone, it is possible to store a golf data management program in a portable telephone or a PHS telephone provided with the position measuring unit 12. In such a case, an urgent call can be made from a fixed telephone or another portable telephone via the communication network 3. Also, the portable communication terminal 1 should preferably have a waterproof structure. Therefore, the waterproof structure of a portable telephone can be applied to the portable communication terminal 1.

The input device 17 comprises: the input buttons 20 including a shot button, a putt button, a penalty button, a cancel button, a holed-out button, an advice button, and an acquiring button; the select switch 19 which selects an input item or the like; and the simple display unit 18 which displays results of a contest between players or the like. This input device 17 is connected to the input unit 16 of the portable communication terminal 1. Although the connection between the input device 17 and the input unit 16 is made by a signal line, a wireless connection structure using infrared rays or radio waves may be applied to this system. Also, the input function of the input device 17 may be incorporated into the input unit 16 of the portable communication terminal 1, thereby eliminating a need for the separate input device 17.

The data center 2 comprises: the process reception unit 21 which is connected to the communication network 3 and performs data transmission and reception operations; the authentication unit 22 which determines from a pre-stored ID (identification number) or the like whether or not the portable communication terminal 1 can access the data center 2; the individual data storage unit 23 which stores golf data in accordance with an individual ID that is registered in advance; the group data storage unit 24 which registers accompanying players on the golf course prior to the start of the play, and manages data on the performances; the common data storage unit 25 which stores the course map data or the like about the golf course; the data analysis unit 26 which analyzes the stored data and produces advice or the like; the transaction processing unit 27; and the distribution processing unit 28 which distributes a tabulated score and data analysis results.

The communication network 3 includes one or a plurality of base stations (not shown) that have radio communication with the portable communication terminal 1 and one or a plurality of exchange centers. The base stations generally are disposed so as to be able to have radio communication with portable telephones or PHS telephones within the golf course. Accordingly, there is no need to employ a trunk connection unit such as an exchange center that connects the portable communication terminal 1 and the data center 2. The connection between the portable communication terminal 1 and the data center 2 may also be the Internet connection, so that data transmission and reception can be performed with packets.

The golf course 4 generally includes at least 18 holes, but the course layout varies with each course. Accordingly, the common data storage unit 25 in the data center 2 stores course map data in accordance with the names and identification numbers of golf courses, and measurement data such as the latitudes and longitudes. The course map data includes information such as the fairway conditions and green conditions as well as the layout of each course. The course map data can even include information on the location of the cups on the greens of the day.

There are twenty-four communication satellites 5 passing along an orbit that is 21,000 km above the ground. By receiving a radio signal from three or more of the communication satellites 5, the latitude and longitude can be measured. By receiving a radio signal from four or more of the communication satellites 5, a three-dimensional location measurement, including the altitude, can be carried out. The measuring unit 12 of the portable communication terminal 1 receives the radio signal from the communication satellites 5, and detects the current position from the latitude and longitude. The measuring unit 12 can even detect the altitude. Various known GPS structures may be applied to the structure of the measuring unit 12. Since a course may have a large variation in elevation levels, it is preferable to be capable of measuring the altitude.

The data processing unit 6 transmits the data of practice prior to the start of a round, the data of practice on a golf practice course, or even the data of practice at home, to the data center 2. In the data center 2, those data are stored in the individual data storage unit 23, and past data can be downloaded from the individual data storage unit 23 and displayed. Accordingly, a personal computer that can connect to the communication network 3, such as the Internet, can be used. It is also possible to use the portable communication terminal 1 as the input device of the practice data. Furthermore, the practice data and the past play data can be downloaded from the data center 2 and used as reference for practice.

When the layout of the golf course 4 is desired to be grasped prior to the start of a round on the golf course 4, it is possible to request the data center 2 to provide the course map data, using the portable communication terminal 1. In such a case, the identification number of the golf course and the individual identification number of the player are required. The individual ID of the player, who carries the portable communication terminal 1 during the play, and an address for the transmission to the data center 2 are stored in the portable communication terminal 1 in advance. In this manner, the individual ID, the measurement data obtained by the measuring unit 12, the request for the course map data, and the address of the data center 2 can be transmitted as a packet from the communication unit 14 to the data center 2 via the communication network 3.

In the data center 2, the authentication unit 22 compares a received individual ID with a registered individual ID. If the received individual ID coincides with the registered individual ID, the common data storage unit 25 is searched in response to a course map data request. The common data storage unit 25 stores location data associated with the course map data of the golf course, so that the common data storage unit 25 can be searched for the requested golf course based on the received measurement data. The course map data is then read out, and under the control of the distribution processing unit 28, the course map data can be transmitted as download data to the portable communication terminal 1 that has issued the course map data request.

The portable communication terminal 1 receives the course map data from the communication unit 14 and stores the course map data in the recording unit 13. The entire layout or the layout of each hole on the course is displayed on a display unit contained in the output unit 15. The course map data may include information, such as the distance between the tee and the green, the locations of the green and sub-green, the type of lawn, and the rub of the green. Furthermore, local weather information may be gathered for the golf course, so that wind-direction data or wind-speed data can be added to the course map data. With the wind-direction data, a player can judge whether or not the wind is against wind. It is also possible to provide a service in which lightning information is gathered so as to be able to send an urgent warning to the portable communication terminal 1 carried by a player who is on a golf course situated in a place with a high lightning possibility.

When a player makes a round on a golf course, carrying the portable communication terminal 1, a shot button of the input buttons 20 on the input device 17 is pressed prior to the first shot so as to indicate the tee (the start of the round). Even when the first-shot ball goes out of the fairway and enters the rough, and a second shot is to be made, a shot button is pressed to make the second shot from the rough.

If the second shot from the rough indicates an out-of-bounds (OB) ball, a third shot is made as a penalty from a fairway location in the vicinity of the OB location. Before the third shot is made, the penalty button of the input buttons 20 should be pressed once, so as to input one penalty. At the same time, a shot button should also be pressed. In case of two penalties, the penalty button should be pressed twice, and in case of four penalties, the penalty button should be pressed four times. The number of times the penalty button has been pressed is displayed on the simple display unit 18 so as to allow the player to check the number of penalties. Also, if there is a wrong input with the input buttons 20, a cancel button should be pressed to retry a correct input operation.

If the third shot successfully puts the ball back on the fairway, a shot button should be pressed prior to a fourth shot. If the fourth shot puts the ball onto the green, the putt button of the input buttons 20 should be pressed before a fifth shot is made as a putting shot on the green. If the putting shot puts the ball in the cup, the holed-out button of the input buttons 20 should be pressed.

The portable communication terminal 1 can detect the location of a shot to be made by a player by the measuring unit 12. The measurement data that is obtained when the shot button or the putt button is pressed and the shot or putt data are combined with the number of penalties, and the combined data is recorded as play data in the recording unit 13 through the handling of the input buttons 20 under the control of the processor 11. When the holed-out button is pressed, an individual ID that is registered in advance is added to the play data in the recording unit 13, and the play data provided with the individual ID is outputted as upload data from the communication unit 14 to the data center 2 via the communication network 3. The data center 2 stores the play data of each player in the individual data storage unit 23 in accordance with the individual IDs.

The group data storage unit 24 in the data center 2 manages data on performances of accompanying players. In conjunction with the individual data storage unit 23, the group data storage unit 24 determines whether or not all the accompanying players have pressed the holed-out button, and distributes a score to each of the accompanying players. It is possible to input play data through the portable communication terminal 1 of each of the accompanying players prior to the start of a round. Also, by pressing the shot button prior to the first shot from the tee at the start of a hole, the individual ID and the location data may be transmitted from the portable communication terminal 1 to the data center 2. When receiving a plurality of individual IDs from the same location data, the data center 2 determines that the individual IDs belong to the accompanying players, and stores and manages those individual IDs as a part of the group data.

By pressing the holed-out button at the first hole, the recording data provided with the individual data of the hole-outs at the same location within a predetermined period of time is transmitted to the data center 2. Accordingly, the data center 2 determines that the recording data is from the accompanying player, and sets the group data based on the individual data added at this point. Accordingly, based on the individual IDs of the group, the scores of all the members of the group can be transmitted to the portable communication terminal 1 of each of the accompanying players under the control of the distribution processing unit 28. Since the scores of all the members can be displayed, there is no need to fill out a score card. Also, the scores can be displayed without asking each accompanying player.

When all the accompanying players have pressed the holed-out button at the eighteenth hole, the score of the last hole is transmitted to the data center 2. Here, the data center 2 tabulates the score of each hole, and transmits the tabulation result to the portable communication terminal 1 of each of the accompanying players under the control of the distribution processing unit 28. The course score of the accompanying players can be distributed to the display included in the output unit 15 in the portable communication terminal 1. Thus, all the accompanying players can check the results of the game.

The data processing unit 6 adds each individual ID to individual practice data, including the choice of golf clubs and shot distances on a golf practice field, and transmits the combined data as upload data to the data center 2 via the communication network 3. The data center 2 in turn authenticates each individual ID. After the authentication, the data center 2 stores the practice data into the individual data storage unit 23 in accordance with the individual IDs. It is also possible to download past practice data and score data from the individual data storage unit 23 into the data processing unit 6, and then to display this data. Furthermore, based on the downloaded data, a game or simulation can be performed.

Figure 2:
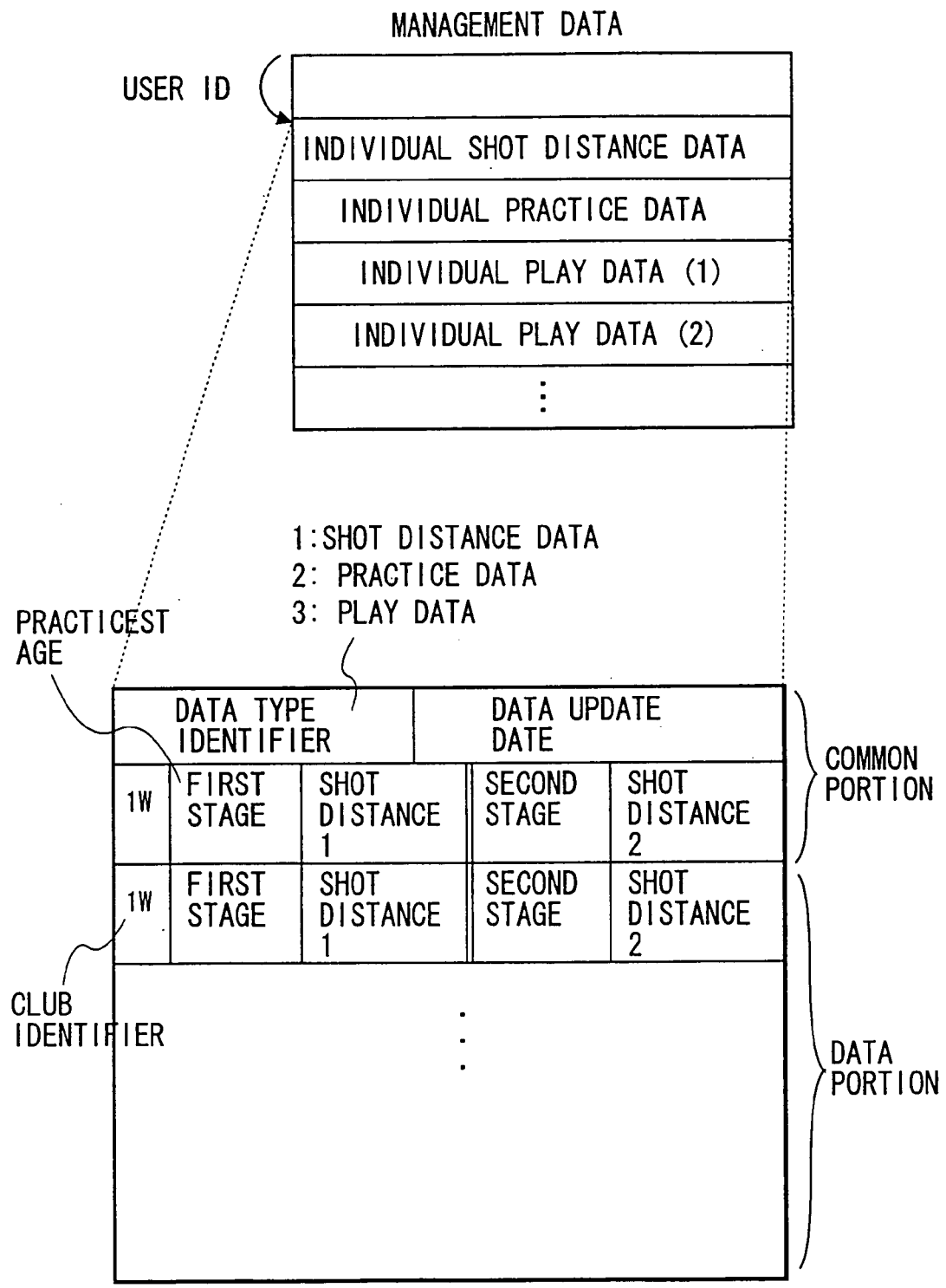
FIG. 2 shows the structure of individual shot distance data in the embodiment of the present invention.

The data stored in the individual data storage unit 23 includes individual shot distance data, individual practice data, and play data of a single or a plurality of individuals, in an area corresponding to the user IDs (individual IDs), as shown in FIG. 2. As shown in the enlarged lower half of FIG. 2, the individual shot distance data includes a common portion and a data portion. The common portion includes areas for a data type identifier and a data update date. The data type identifier may be "1" for shot distance data, "2" for practice data, and "3" for play data.

The data portion includes areas for club identifiers, the floor numbers of the practice field, and shot distances. The area for the floor numbers is used only when the data identifier is 2. The club identifier may be "1W" for a No. 1 wood, "2W" for a No. 2 wood, "1I" for a No. 1 iron, and "2I" for a No. 2 iron. The relationship between the different levels of elevation and the type of club can be determined from the floor numbers, the types of clubs, and the shot distances. Accordingly, on a golf course that has various levels of elevation, advice on the choice of clubs can be issued from the data center 2 to each player carrying the portable communication terminal 1.

Figure 3:
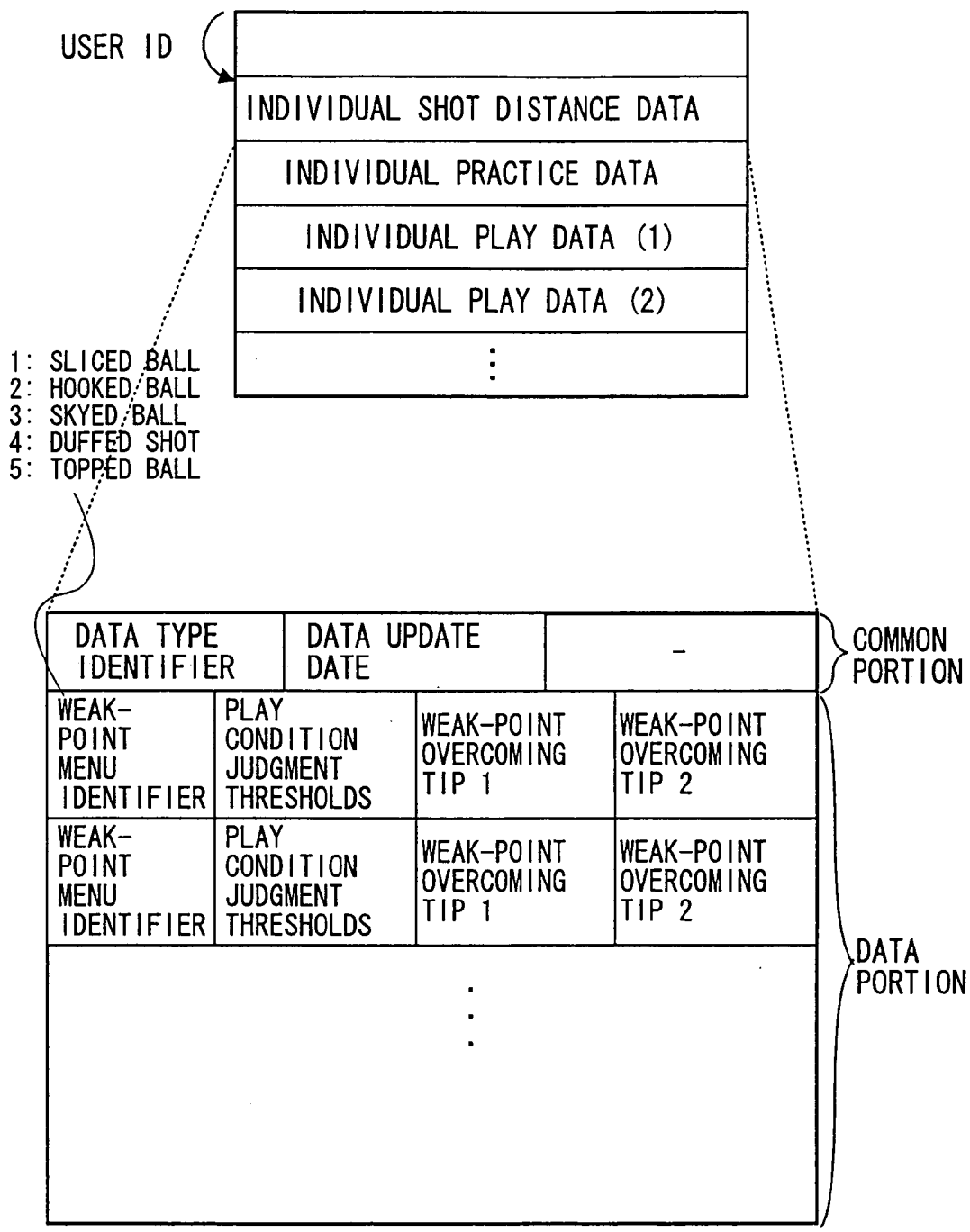
FIG. 3 shows the structure of individual practice data in the embodiment of the present invention.

The individual practice data in the management data comprises a common portion and a data portion, as shown in the enlarged lower half of FIG. 3. The common portion includes areas for a data type identifier and a data update date, like in the case of the shot distance data. The data portion includes weak-point menu identifiers, performance judgment thresholds, and weak-point overcoming tips. The weak-point menu identifiers may be "1" for a sliced ball, "2" for a hooked ball, "3" for a skyed ball, "4" for a duffed shot, and "5" for a topped ball.

The performance judgment thresholds are used to judge the performance from the ratio of sliced shots or hooked shots to the total number of shots. The weak-point overcoming tips are used to correct weak points of the player, such as slicing and hooking. Those weak points in swinging cannot be completely corrected on an actual course, even though the player thinks that he/she has overcome those weak points on a practice field. In this embodiment, in response to an advice request inputted through the portable communication terminal 1 during a round, the data center 2 judges the condition of each player from the current play data. In other words, the performance is determined by comparing the ratio of failed shots such as sliced shots and hooked shots to the total number of shots with the performance judgment thresholds. In this manner, advice can be provided based on the weak-point overcoming tips that have actually been effective in a practice course.

Figure 4:
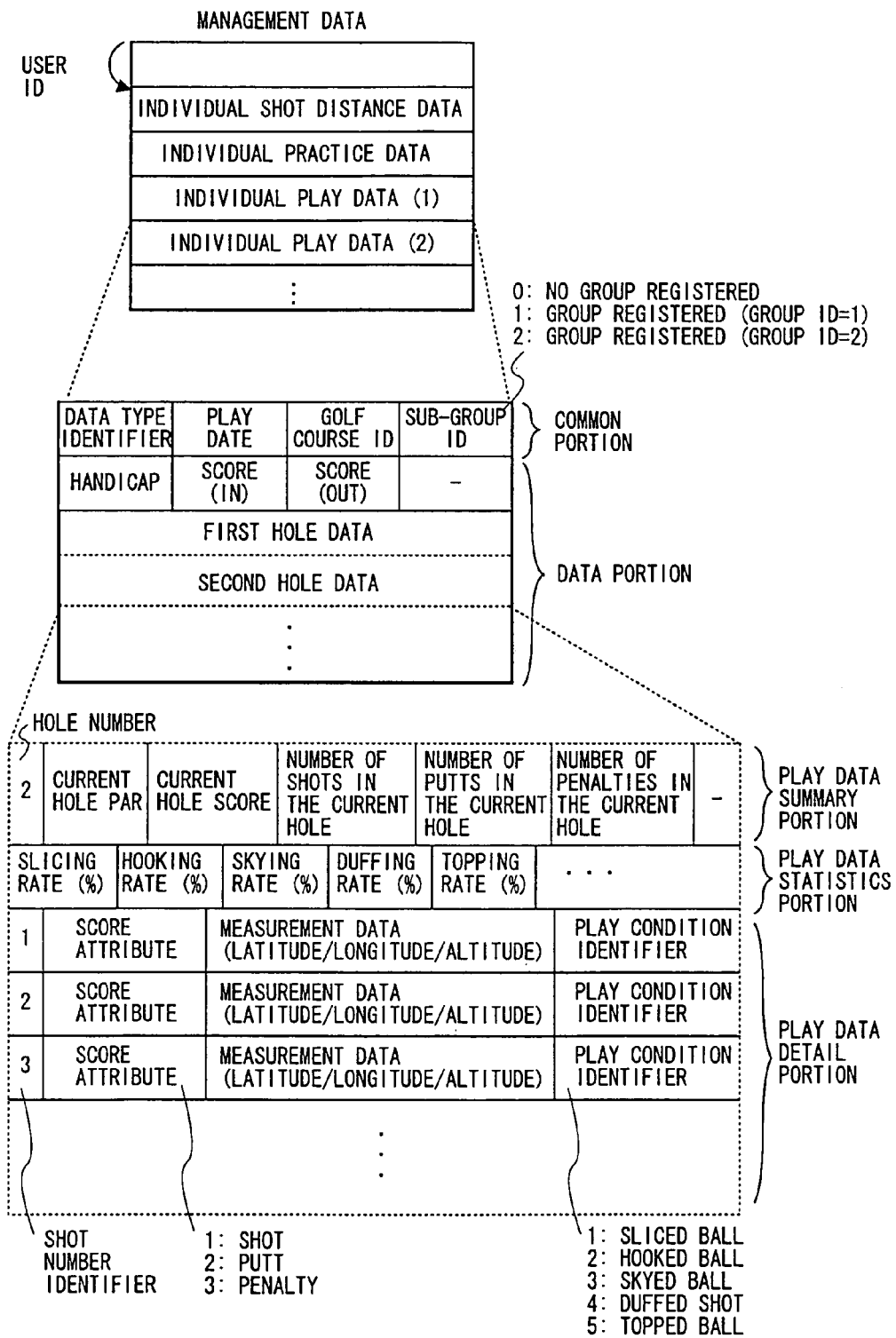
FIG. 4 shows the structure of individual play data in the embodiment of the present invention.

The individual play data in the management data comprises a common portion and a data portion, as shown in the enlarged middle section of FIG. 4. The common portion includes a data type identifier for identifying shot distance data, practice data, or play data, a play date, the golf course ID for identifying a golf course, a sub-group ID, a handicap (HC), a score region that stores the total score on the in-course, and another score region that stores the total score on the out-course. The data portion includes areas for storing the play data of each hole.

Each of the play data storing areas comprises a play data summary portion, a play data statistics portion, and a play data detail portion. The play data summary portion includes a hole number, the par number of the current hole, the number of tried shots, the number of tried putts, and the number of penalties. The play data statistics portion includes a slicing rate, a hooking rate, a skying rate, a duffing rate, and a topping rate, with respect to the total number of tried shots in the hole.

The play data detail unit comprises shot number identifiers, score attributes corresponding to the shot number identifiers, measurement data (latitude/longitude/altitude), and performance identifiers. For instance, the score attributes include "1" for a shot, "2" for a putt, and "3" for a penalty. The performance identifiers include "1" for a sliced ball, "2" for a hooked ball, "3" for a skyed ball, "4" for a duffed shot, and "5" for a topped ball.

As described above, by pressing the holed-out button, the play data recorded in the recording unit 13 in the portable communication terminal 1 is transferred to the data center 2, and stored in the area of the individual play data in the individual data storage unit 23. Taking the first shot in FIG. 1 for instance, the play data detail portion shows that the shot number identifier is "1" indicating the first shot, the score attribute is "1" indicating a shot, the measurement data is the location data of the tee, and the performance identifier is "1" indicating a sliced shot.

Figure 5:
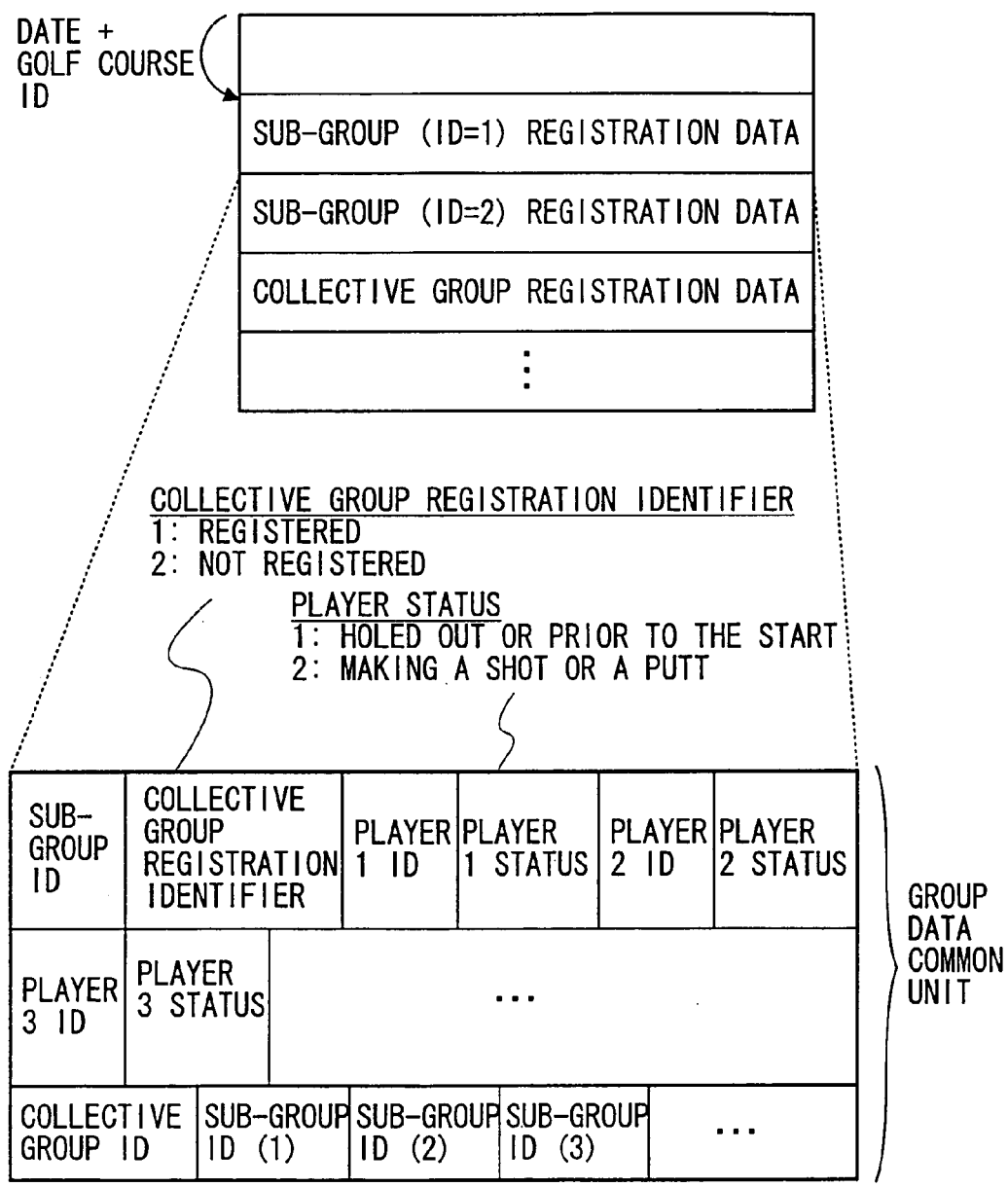
FIG. 5 shows the structure of group data in the embodiment of the present invention.

FIG. 5 shows the data structure of group data, which shows the structure of the group data storage unit 24 in the data center 2 shown in FIG. 1. The group data includes areas for sub-group (ID=1) registration data, sub-group (ID=2) registration data, and collective group registration data, in accordance with the date and the golf course ID.

The group data common portion includes areas for a sub-group ID, a collective group registration identifier, IDs of players 1, 2, and 3 that belong to the sub-group, a status for each of the players, a group ID, and sub-group IDs. The collective group registration identifier is "1" when no group is registered. The collective group registration identifier is "2" when there is a group that is registered. Each player status is "1" for indicating a time of the hole-out or a time prior to the start. Each player status is "2" for indicating a shot or a putt. A sub-group corresponds to one party, while a collective group consists of a plurality of sub-groups in a case where a large number of players participate in a competition. Accordingly, a plurality of sub-group IDs are registered with a single collective group ID.

After all the players that belong to one sub-group have pressed the holed-out button, the statuses of the accompanying players, such as the player 1, player 2, and player 3, become "1". In accordance with the player IDs registered in the sub-group, the play data summary portion (shown in FIG. 4) is distributed from the data center 2 to the portable communication terminal of each of the members in the sub-group. By doing so, the members in the sub-group can check the score of one another. If a collective group is registered, the scores of all members that belong to the collective group can be transmitted in response to a request from a player having a sub-group ID that belongs to the collective group. Here, the data can be transmitted in an order of the score size. Also, one person in another sub-group that belongs to the collective group may be designated to request a score.

Figure 6:
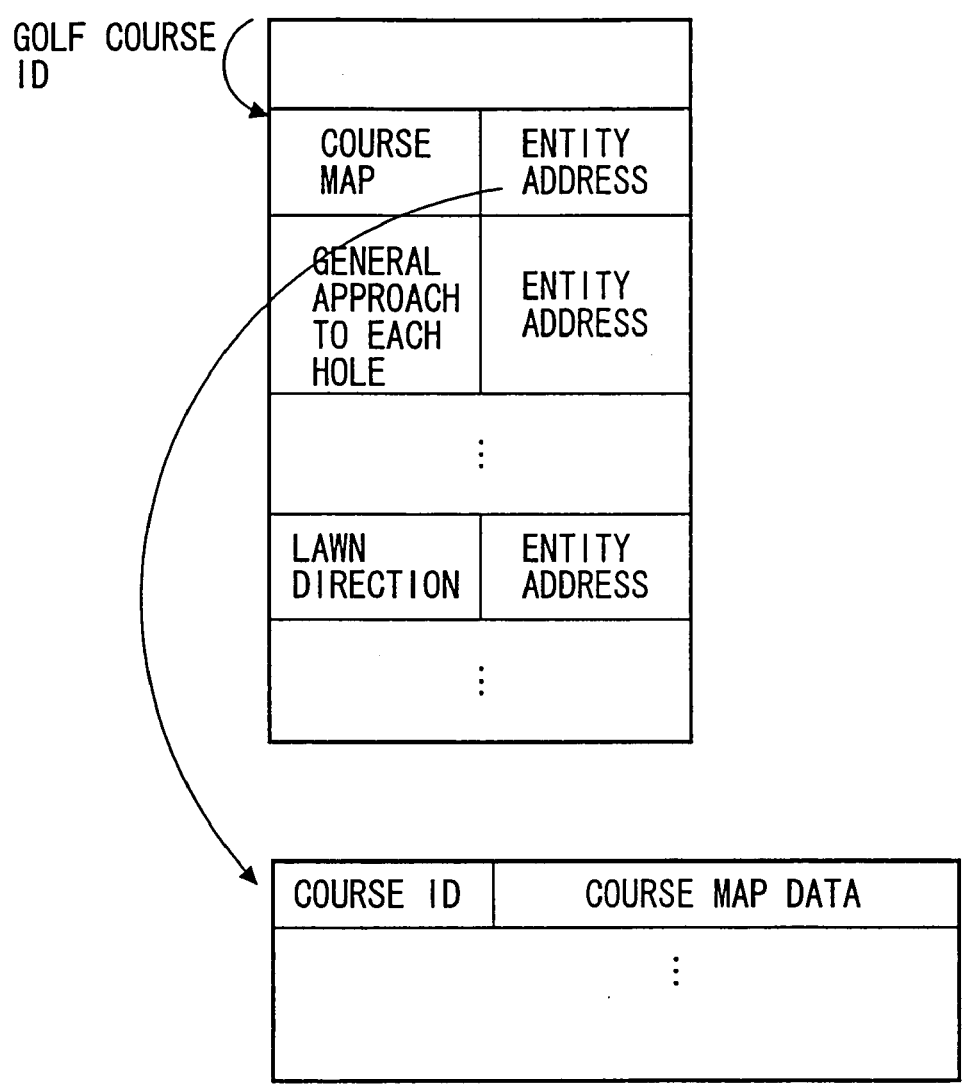
FIG. 6 shows the structure of common data in the embodiment of the present invention.

FIG. 6 shows common data that illustrates the structure of the common data storage unit 25 shown in FIG. 1. The common data includes areas for a course map, the general approach to each hole, and rub-of-the-green information. The course map stores a course ID and course map data. When a player presses the acquiring button by selecting the course data with the select switch of the portable communication terminal 1, the data center 2 downloads the layout of the hole at which the player is located from the common data storage unit 25 into the portable communication terminal 1.

Figure 7:
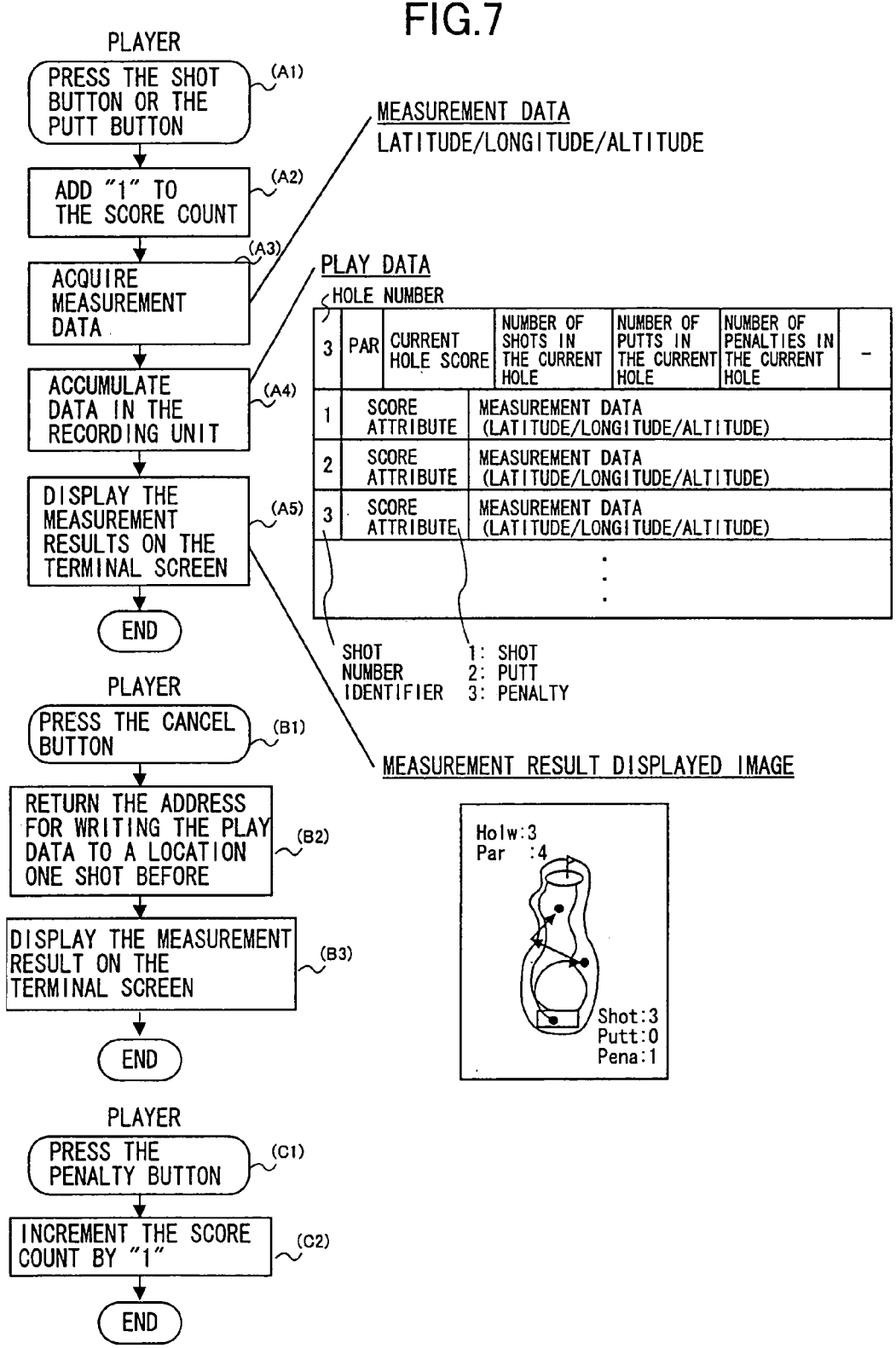
FIG. 7 illustrates a play data input process in accordance with the present invention.

FIG. 7 is a flowchart of a play data input process. When a player presses the shot button or the putt button on the input device 17 of the portable communication terminal 1 in step A1, the score count is incremented by 1 in step A2, and the measurement data is obtained by the measuring unit 12 in step A3. The measurement data includes information on the latitude, longitude, and altitude, for instance, and is recorded in the recording unit 13 in the portable communication terminal 1 in step A4. The play data recorded in the recording unit 13 has the same data structure as shown in FIG. 4. The measurement results are displayed on a terminal screen (the display included in the output unit 15) in step A5. In FIG. 7, the shot paths of the first to third shots in a par 4 hole are displayed as a measurement result displayed image. As the second shot was an out-of-bounds shot in this example, the contents of the display include "Shot: 3", "Putt: 0", and "Penalty: 1".

When the shot button or the putt button has been wrongly pressed, the cancel button is pressed so as to prevent wrong recording in the recording unit 13 in step B1. By doing so, the address for writing the play data in the recording unit 13 is returned to a location situated one shot before in step B2. More specifically, when the shot button or the putt button is pressed again, the address for writing the play data is put back to the shot number identifier one shot before. The measurement results are displayed on the terminal screen in step B3.

When the second shot (an out-of-bounds shot) is made, the penalty button is pressed in step C1. Here, the score count is incremented by "1" in step C2. If the number of penalties is larger than 1, the score count is incremented by the number of times the penalty button has been pressed. In such a case, the number of penalties is recorded so as to obtain the total number of penalties at each hole or in one round.

FIG. 8 shows the format of data to be transmitted and received between the portable communication terminal and the data center. An upload head and upload data are transmitted from the portable communication terminal 1. Although not shown in the figure, the address information of the data center 2 is allotted to the top of the data, and transferred via the communication network 3. Meanwhile, a download header and download data are transmitted from the data center 2. Although not shown in the figure, the address information of the portable communication terminal 1 is allotted to the top of the data, and transferred via the communication network 3.

The upload header comprises a user ID (an individual ID) and a process contents identifier. The process contents identifier is "1" for indicating a holed-out process or "2" for indicating an acquiring process. The acquiring process is "1" for indicating a request for advice, "2" for indicating a request for a course map, "3" for indicating a request for performance data, or "4" for indicating a request for weather data. The performance data is "1" for indicating a request for the score ranking in a collective group, "2" for indicating a request for the ranking in a longest drive competition, "3" for indicating a request for the ranking in a nearest-to-the-pin competition, or "4" for indicating a request for the score of a designated player.

The download header includes a user ID (an individual ID) and an information contents identifier. The information contents identifier is "1" for indicating distribution data (score) or "2" for indicating acquirement data. The acquirement data is "1" for indicating advice, "2" for indicating a course map, "3" for indicating performance data, or "4" for indicating weather data. The performance data is "1" for indicating the score ranking, "2" for indicating the ranking in a longest drive competition, "3" for indicating the ranking in a nearest-to-the-pin competition, or "4" for indicating the score of a designated player. Taking the ranking in a longest drive competition for instance, the play data of users that belong to a collective group is searched and compiled in the descending order of the shot distance of the first shot, thereby forming download data. Here, the information contents identifier is set as "2-3-2" to download the data to a portable communication terminal 1 that has made a request for the data.

Figure 9:
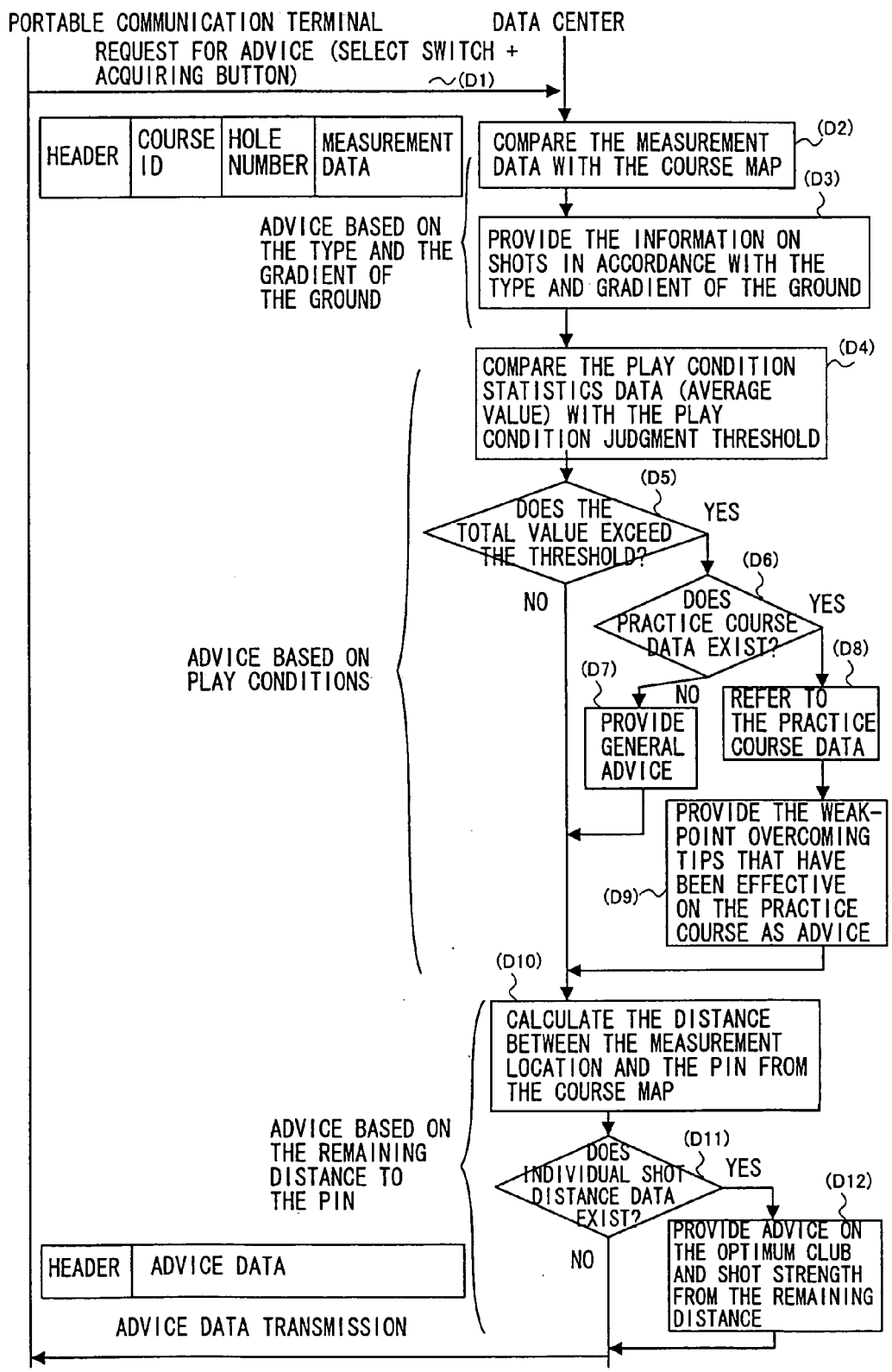
FIG. 9 illustrates an advice request process in accordance with the present invention.

FIG. 9 illustrates an advice request process. In this process, a request for advice is made from a portable communication terminal 1 to the data center 2. First, an advice request is selected by pressing the select switch 19 on the input device 17 in the portable communication terminal 1, and the acquiring button is then pressed in step D1. By doing so, a data format including a header, a course ID, a hole number, and measurement data is formed. The address of the data center 2 is then added to the data format, and transmitted from the communication unit 13 of the portable communication terminal 1 to the data center 2 via the communication network 3.

The data center 2 receives the data through the process reception unit 21. The authentication unit 22 of the data center 2 authenticates the user ID. When the type and the gradient of the ground are determined and included in the advice, the measurement data is compared with the location data of the course map so as to determine the gradient of the ground of the current location in step D2. More specifically, based on the altitude data of the course map and the current location determined from the measurement data, the direction of the gradient at the current location of the player is determined. The type of the ground (the fairway, the rough, or a bunker) of the current location of the player is determined based on the ground type data of the course map. For instance, in accordance with the condition of the current location and the distance from the target location, as well as the shot distance data stored in the individual data storage unit 23, the information on the choice of clubs and shots is provided as advice in step D3.

If advice is to be given with respect to the performances, the performance statistics data (the ratio of the number of failed shots to the total number of shots) is compared with a performance judgment threshold in step D4. It is then determined whether or not the condition statistics value exceeds the condition judgment threshold in step D5. If the condition statistics value does not exceed the threshold, the condition is determined to be good. If the condition statistics value exceeds the threshold, it is determined whether or not practice course data is included in step D6. In other words, it is determined in step D6 whether or not the individual practice data shown in FIG. 3 is stored in the individual data storage unit 23 in accordance with the user ID. If there is no practice course data, general advice is provided in step D7. If there is practice course data, reference is made to this practice course data in step D8, and the weak-point overcoming tips that have been effective on the practice course are provided as advice in step D9.

The distance to the pin is determined from the measurement data and the positional data of the course map in step D10. It is then determined whether or not the individual shot distance data is stored in the individual storage unit 23 in step D11. If no individual shot distance data is stored in the individual data storage unit 23, the operation comes to an end. If the individual shot distance data is stored in the individual data storage unit 23, advice on the optimum club and the hitting strength for the shot is determined from the remaining distance in step D12. In this case, if the remaining distance is too long to reach the green, the optimum location on the fairway is determined as the target location, and advice on the choice of clubs should be given so as to obtain a shot distance corresponding to the distance to the target location. Also, taking the different levels of elevation shown in the course map into consideration, advice on the choice of clubs can be given based on the number of floors and the shot distance in the practice data.

Figure 10:
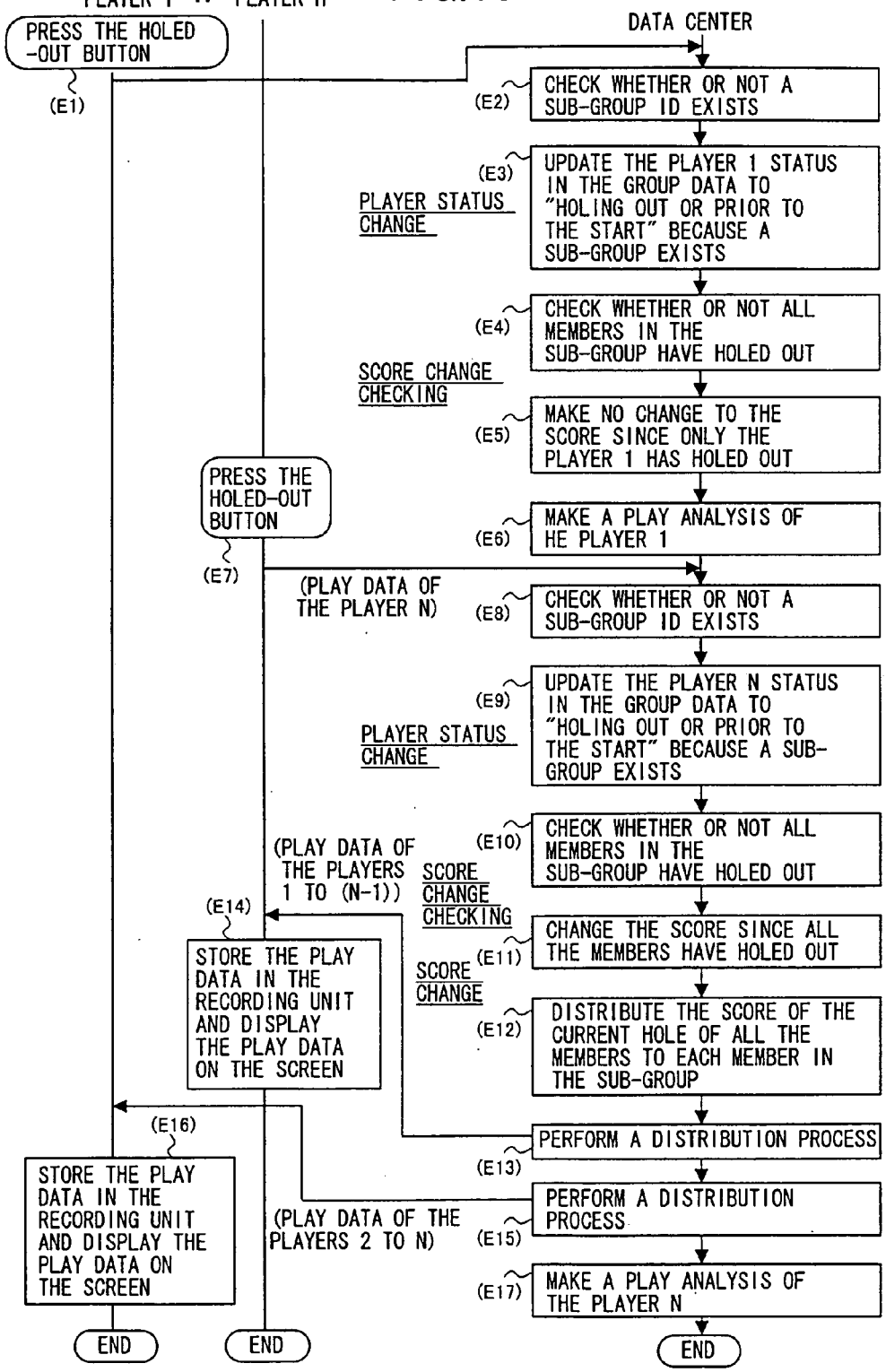
FIG. 10 illustrates a holed-out button pressing process in accordance with the present invention.

FIG. 10 shows a holed-out button pressing process in which players 1 to n each carry a portable communication terminal 1 that transmits data to and receives data from the data center 2 via the communication network 3. When the player 1 presses the holed-out button in step E1, the upload header shown in FIG. 8 is allotted to the play data including the hole number, the shot number identifier, the score attribute, and the measurement data recorded in the recording unit 13 in the portable communication terminal 1 of the player 1. The combined data is then transmitted from the communication unit 14 in the portable communication terminal to the data center 2 via the communication network 3.

Based on the user ID of the upload header, the data center 2 checks whether or not a sub-group ID exists in step E2. Consisting of the players 1 to n, this group is determined to be a sub-group. The player 1 status in the group data (shown in FIG. 5) is updated at the time of holing out or prior to the start of a hole in step E3. After the updating of the player status, a score change is checked. More specifically, it is determined whether or not all the members in the sub-group have holed out in step E4. Since only the player 1 has holed out in this example, no change is made to the score in step E5. Based on the play data of the player 1, a play analysis is made in step E6.

After the players 2 to (n-1) have pressed the holed-out button and performed the same processes as described above, the player n presses the holed-out button in step E7. The play data of the player n is then transmitted to the data center 2, which in turn confirms the existence of a subgroup ID upon receipt of the player data from the player 1 in step E8. Since there is a sub-group in this example, the status of the player n in the group data is updated at the time of holing out or prior to the start of a hole in step E9. After the update of the player status, it is checked whether or not a change of the score is necessary. More specifically, it is determined whether or not all the members in the sub-group have holed out in step E10.

In such a case, the statuses of all the players in the sub-group become "1", it is determined that the players 1 to n have holed out, and that the score can be changed in step E11. The score of all the members in the sub-group is then distributed to each of the members in step E12. The distribution processing unit 28 of the data center 2 distributes the play data of the other players to each member. More specifically, the play data of the players 1 to (n−1) is distributed to the player n in step E13, and the play data of the players 2 to n is distributed to the player 1 in step E15. The play data of each player is recorded in the recording unit 13, so that each of the players can receive the play data of all the other players. Each of the players 1 to n can record the received data in the recording unit 13 of the portable communication unit 1, and display the data on the display in the output unit 15 in both steps E14 and E16. In this manner, the scores of all the members in the sub-group can be checked. To reduce the data amount to be distributed, it is possible to distribute only the play data summary portion (shown in FIG. 4) in steps E13 and E15.

FIG. 11 illustrates a play analysis in accordance with the present invention. In this example, the first shot in the first hole is a hooked ball, and the second shot is a sliced ball. According to an analysis technique, the type of each shot is inputted by the player, and analyzed in the data center 2. According to another analysis technique, failed shots, such as a sliced ball and a hooked ball are analyzed based on the measurement data in the data center 2.

In the former technique, the input buttons 20 corresponding to the types of failed shots, such as a sliced ball, a hooked ball, a skyed ball, a duffed shot, and a topped ball, are arranged on the input device 17. After a shot is made, an input button corresponding to the type of the shot is selected from the input buttons 20 and pressed so as to record the type of the shot as the performance identifier in the recording unit 13. By pressing the holed-out button, the play data recorded in the recording unit 13 is then transmitted to the data center 2, which in turn stores the play data in the individual data storage unit 23.

The play data detail portion in the individual play data stored in the individual data storage unit 23 includes the performance identifiers, such as "1" for a sliced ball, "2" for a hooked ball, "3" for a skyed ball, "4" for a duffed shot, and "5" for a topped ball, as shown in FIG. 4. The type of each shot can be judged from each corresponding performance identifier, and each shot number can be judged from each corresponding shot number identifier. A value is inputted into each performance identifier in the play data detail portion, so that the slicing rate, the hooking rate, the skying rate, the duffing rate, and the topping rate can be determined in the play data statistics portion. If any of the rates exceeds the performance judgment threshold, the play can be judged to be poor.

In FIG. 11, the abscissa axis indicates the hole number and the time, and the ordinate axis indicates the failed shot rate. If the total number of shots is 3 in the first hole, a sliced ball and a hooked ball each represent 33% of the total number of shots. With the performance judgment threshold being set at 50%, for instance, the performance in the first hole can be judged to be poor.

In the latter technique, in which the sliced ball and the hooked ball are analyzed in the data center 2, the holed-out button is pressed to transmit the score data including the measurement data recorded in the recording unit 13 of the portable communication terminal 1 to the data center 2. The data center 2 in turn stores the hole data in the individual data storage unit 23. In accordance with the measurement data corresponding to each shot number identifier, the first shot is judged to be a hooked ball because the shot is out of the fairway and located on the left side of the fairway seen from the tee. Comparing the location data on the fairway with the measurement data obtained prior to the second shot, a shot within the fairway is determined to be normal. A shot that goes out of the fairway and is located on the left side of the fairway is determined to be a hooked ball, and a shot that goes out of the fairway and is located on the right side of the fairway is determined to be a sliced ball.

If the second shot is directed to the green, it is determined whether or not the measurement data of the location of the third shot is within the range of the green from the location of the second shot. As long as the measurement data is within the range of the green, the shot is determined to be normal, regardless of where the shot is made from. If the shot goes to the right of the fairway, the shot is determined to be a sliced ball. If the shot goes to the left of the fairway, the shot is determined to be a hooked shot. If the shot distance is very short, the shot is determined to be a duffed shot.

The above judgment results are stored in the performance identifiers in the play data detail portion, and the calculated rates are stored in the play data statistics portion. Each of the calculated rates is compared with the performance judgment threshold, thereby judging the performance. The rate of failed shots in each hole and the time are combined to form statistics data. In the example shown in FIG. 11, the performance is poor at the beginning, but gradually gets better in the last half. Also, as the number of sliced balls is large in the morning, insufficient preparation can be considered. Accordingly, the analysis can be used for the next round.

Figure 12:
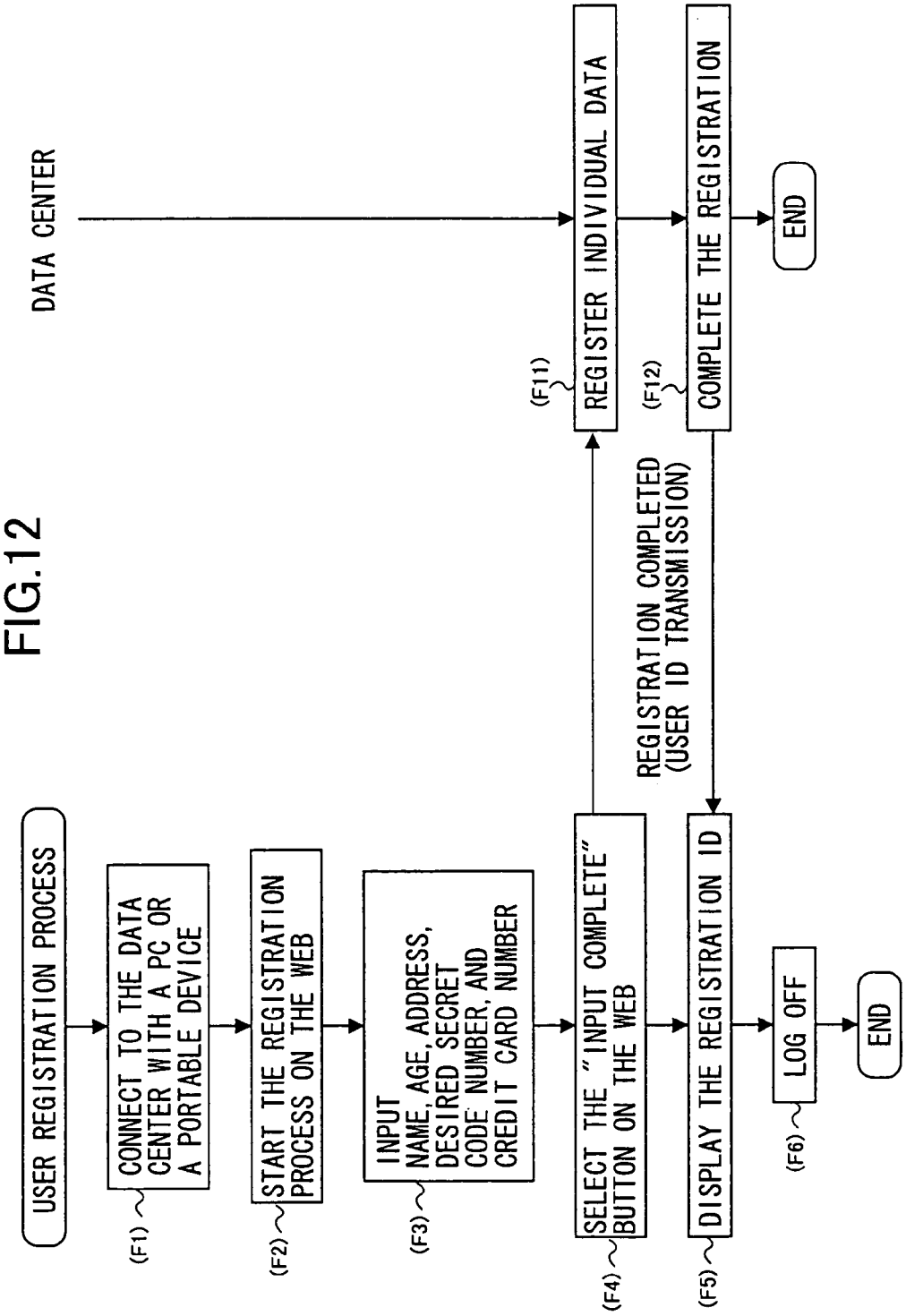
FIG. 12 illustrates a registration process in accordance with the present invention.

FIG. 12 illustrates a registration process in accordance with the present invention. In order to enjoy the service of the above-mentioned golf data management system, a registration process is performed in the data center. More specifically, a personal computer, a portable telephone, or the above-mentioned portable communication terminal 1 is connected to the data center 2 in step F1. A user registration process is then performed on the Web in step F2. The name, the age, the address, a desired secret number, and a credit card number of the user are inputted in step F3. After the input process, an "input complete" button is selected on the Web in step F4. Since the input data includes confidential information such as a credit card number, the contents of the input data are encrypted and then transmitted to the data center 2. In the data center 2, the contents of the input data are decrypted and registered as individual data in step F11. A finishing process is then performed in step F12, and the user ID (individual ID) is transmitted. The received user ID is displayed on the display unit in step F5, so that the user ID can be confirmed. The user ID is then set in the portable communication terminal 1. A logging off process is then performed in step F6, and the operation comes to an end. It is also possible to register the user ID in the authentication unit 22 in the data center 2, for instance, so that an access to the data center 2 can be authenticated with the user ID.

Figure 13:
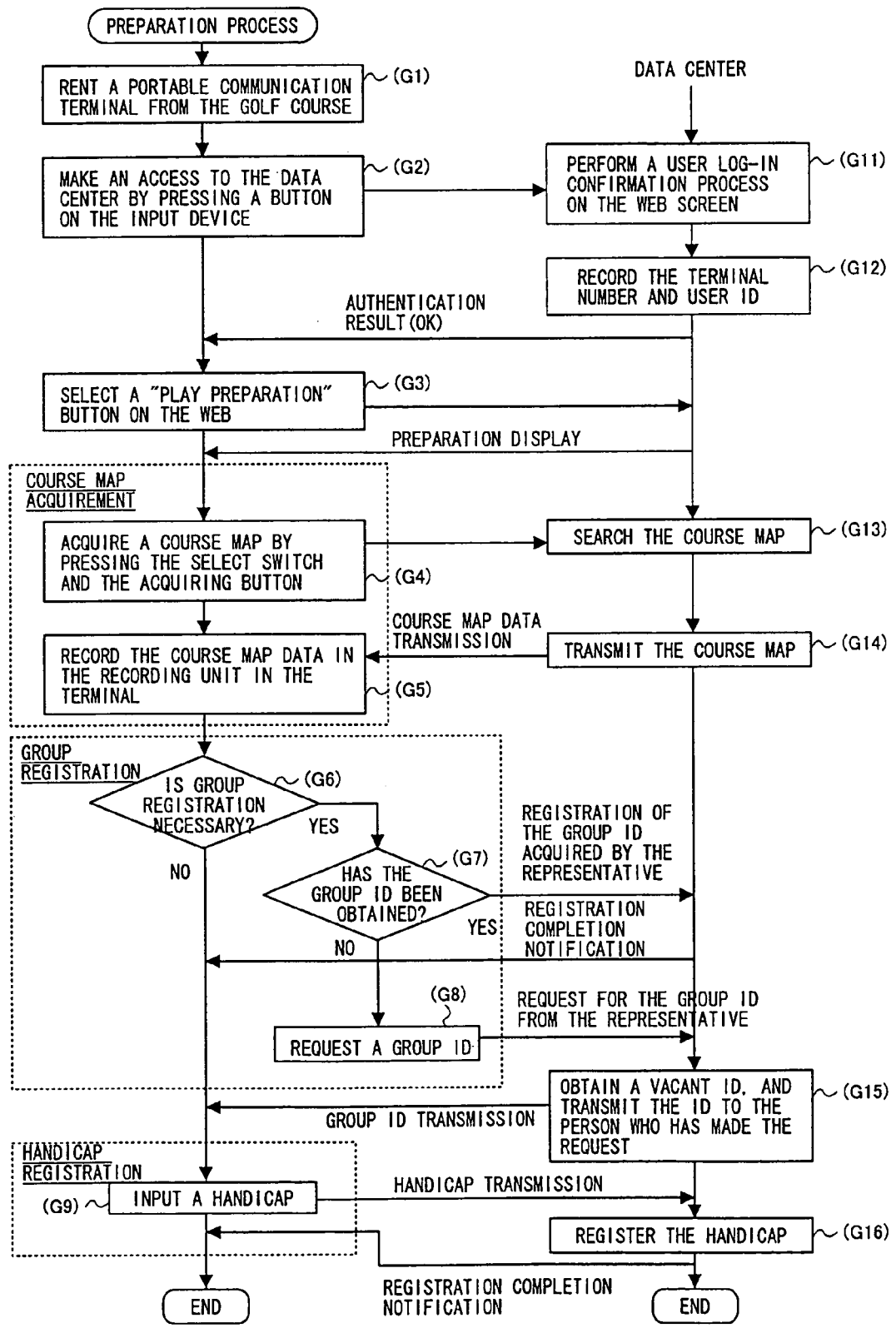
FIG. 13 illustrates a registration process prior to the start of a round in accordance with the present invention.

FIG. 13 illustrates a preparation registration process performed prior to the start of a round. After the above-mentioned registration process (shown in FIG. 12), another registration process is performed prior to the start of the round. A player who does not carry a portable communication terminal needs to rent the portable communication terminal 1 from the golf course in step G1. The user ID is then set in the portable communication terminal 1. As for a player who owns the portable communication terminal 1, the user ID has already been set in the portable communication terminal 1 in the registration process. By pressing a button on the input device 17, an access is made to the data center 2 in step G2.

In this case, the portable communication terminal 1 has the address of the data center 2 as a golf data management program. Accordingly, an access can be easily made to the data center 2 by pressing a button. The data center 2 performs a log-in authentication process by the authentication unit 22 in step G11, thereby registering the terminal number and the user ID in the individual data storage unit 23 in step G12. The authentication result is transmitted to the portable communication terminal 1. The portable communication terminal 1 selects a "play preparation" on the Web display on the display unit in the output unit 15 in step G3. When the preparation registration process is continued using the portable communication terminal 1 that has performed the above-mentioned registration process, the "play preparation" button is selected upon the end of the registration process.

As the data of the selection of the play preparation is transmitted to the data center 2, the preparation image is downloaded. When a course map is desired, a request for a course map is made by the select switch 19 and an acquiring button in step G4. The upload header obtained here comprises the user ID and the course map, as shown in FIG. 8. The course ID is added as upload data to the upload header.

The data center 2 then searches the common data storage unit 25 in step G13, and reads out and transmits the course map data corresponding to the course ID in step G14. The download header in this case comprises the user ID, the acquiring data and the course map. As the download data, the course map is added. The portable communication terminal 1 receives the course map data through the communication unit 14, and records the course map data in the recording unit 13 in step G5. The course map data recorded in the recording unit 13 is displayed on the display unit (the output unit 15).

When performing group registration, it is determined whether or not the group registration is necessary in step G6. When registering a group of accompanying players, it is determined whether or not the group ID has been obtained in step G7. If the group ID has already been obtained, the group ID acquired by the representative of the group is transmitted to the data center 2. If the group ID has not yet been obtained, a request for acquiring the group ID is made in step G8. More specifically, the request for acquiring the group ID is transmitted to the data center 2 by the representative of the group. Upon receipt of the request for acquiring the group ID, the data center 2 selects and secures a vacant ID, and transmits the vacant ID as the group ID to the representative that has made the request in step G15. In a case of a sub-group, as shown in FIG. 5, the data center 2 stores the sub-group ID and the player IDs (user IDs) of players who belong to the sub-group into the group data common portion. In a case of a collective group, the data center 2 stores the collective group ID and the sub-group IDs of subgroups which belong to the collective group ID.

In a handicap registration process, a handicap is inputted through the portable communication terminal 1 and transmitted to the data center 2 in step G9. The data center 2 receives the handicap, and stores the individual play data common portion of the individual data storage unit 23. In other words, handicaps corresponding to each golf course can be registered.

Figure 14:
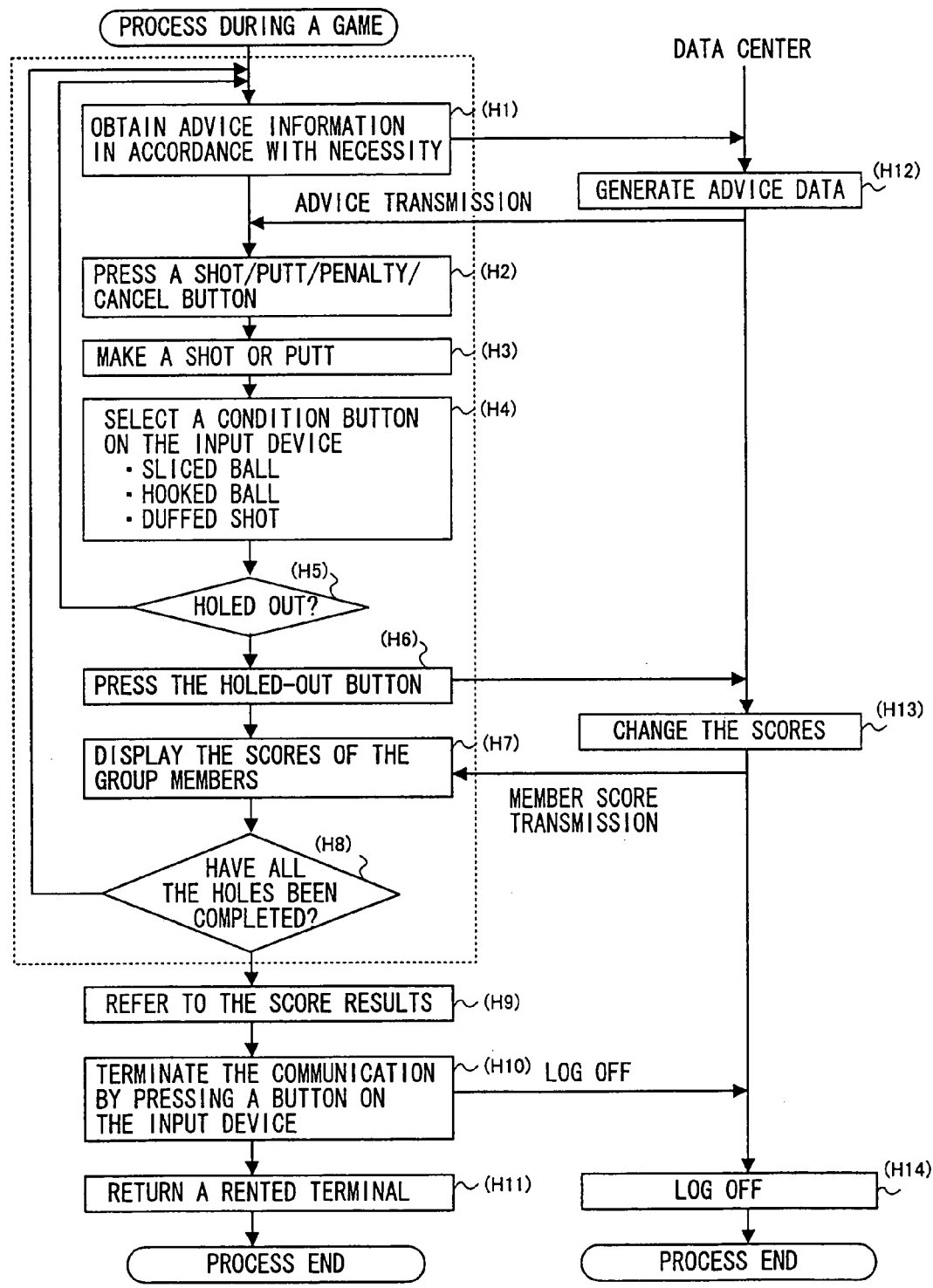
FIG. 14 illustrates a process during a game in accordance with the present invention.

FIG. 14 illustrates a process during a game in accordance with the present invention. When the registration process prior to the game is completed, the acquiring button is pressed to obtain advice during the game in step H1. As in the upload header shown in FIG. 8, the user ID (individual identification number) of each player carrying the portable communication terminal 1 and the process contents request identifier that consists of the acquiring process and the advice are attached to the upload header. The upload data is then transmitted as a packet that also contains the measurement data obtained by the measurement unit 12 to the data center.

In the data center 2, as shown in FIG. 9, the type and gradient of the ground, on which the player is located, is determined from the measurement data and the course map data stored in the common data storage unit 25. Also, the advice data on the choice of clubs and target directions is generated from the shot distance data stored in the individual data storage unit 23. Based on the play data obtained from the previous hole or the past few holes, the performance at the current hole is determined so that advice data can be generated from the practice data stored in the individual data storage unit 23. In a case of a request for advice on the green, advice data on the direction and strength of a putt can be generated based on the location of the cut, the rub of the green, and the gradient of the green. In a case of a request for advice at a location near the green, advice data on the choice of clubs can be generated based on the distance to the pin and the shot distance data. In this manner, advice especially directed to each individual player can be provided.

The portable communication terminal 1 receives the advice data and stores it in the recording unit 13. The advice data is then displayed as characters and figures on the display unit in the output unit 15 of the portable communication terminal 1. Alternatively, the advice data may be converted into audio data and outputted through a speaker of the portable communication terminal 1. By doing so, advice suitable for each individual player at the start of a game or during a game can be provided. Thus, players can continue the game without intermission, and the score of each play can be expected to improve.

Prior to a shot or a putt, the shot button or the putt button is pressed. If a shot is an out-of-bounds ball or goes into the water hazard, the penalty button is pressed once in step H2. A shot or a putt is then made in step H3. The type of the result of the shot or putt, such as a sliced ball, a hooked ball, or a duffed shot, is inputted by selecting the condition button on the input device 17 (shown in FIG. 1) in step H4. The input data is recorded in the recording unit 13 of the portable communication terminal 1.

It is then determined whether or not the player has holed out in step H5. If the player has not yet holed out, the operation returns to step H1. If the player has holed out, the holed-out button is pressed in step H6. By doing so, the play data recorded in the recording unit 1 is transmitted from the communication unit 14 of the portable communication terminal 1 to the data center 2. In this case, the upload header including the user ID and the information contents identifier of the holed-our process "1" and the performance data "3", as well as the play data recorded in the recording unit 13, is transmitted to the data center 2.

The data center 2 stores the upload header and the play data as the individual play data into the individual data storage unit 23 in accordance with the user ID. As shown in FIG. 10, it is determined whether or not a sub-group ID exists. IF there is a sub-group ID, the score is changed when all the members in the sub-group have holed out in step G13. As shown in steps E12 and E13 of FIG. 10, the scores of the members are transmitted through the distribution process.

The portable communication terminal 1 then receives the scores, and then displays the scores of the group members on the display unit in step H7. Accordingly, the scores of all the members in the sub-group can be automatically checked every time all the members have holed out. After that, it is determined whether or not all the holes have been completed in step H8. If all the holes have not been finished, the operation returns to step H1. If all the holes have been completed, the score results are checked in step H9. More specifically, the tabulated results of the scores of all the holes can be downloaded from the data center 2, and displayed on the display unit.

By handling the buttons on the input device 17, the communication with the data center 2 is completed in step H10. As the end of the communication is transmitted to the data center 2, the data center 2 performs a log-off operation in step H14. The rented portable communication terminal 1 is returned to the golf course in step H11. Each player who owns the portable communication terminal 1 simply leaves the golf course.

Figure 15A:
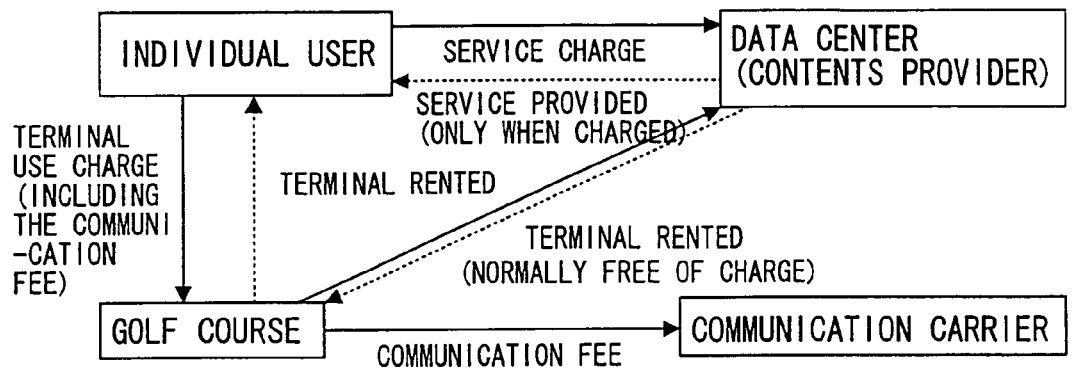
FIGS. 15A to 15C illustrate a process of collecting service charges in accordance with the present invention.
Figure 15B:
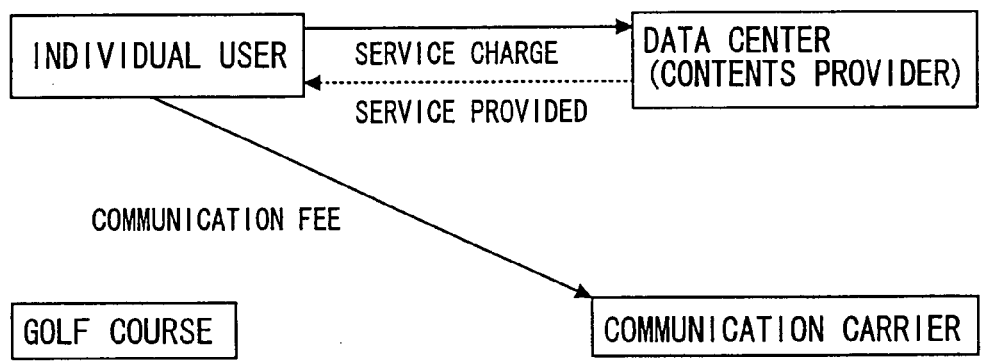
Figure 15C:
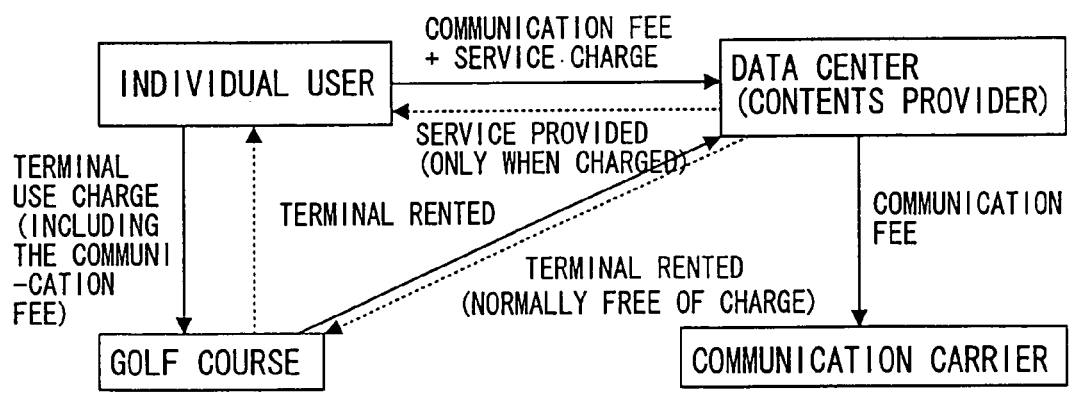

FIGS. 15A to 15C illustrate a process of collecting service charges in accordance with the present invention. These figures show the relationships among the portable communication terminal 1, the data center 2, the communication network 3, and the golf course 4. FIG. 15A shows a case where an individual user, i.e., a player rents the portable communication terminal from the golf course 4. The solid lines indicate the flow of the charges, and the dotted lines indicate the flow of the service in the data center 2 corresponding to contents provider and a communication carrier that forms the communication network 3.

The data center 2 stores and manages the play data of each individual user. In response to an advice request, the advice directed especially to each individual user is provided based on the play data and the practice data of each individual user. The portable communication terminal 1 owned by the data center 2 is rented to the golf course 4, and an individual user then rents the portable communication terminal 1 from the golf course 4. In this case, the golf course 4 pays the data center 2 a rental charge in accordance with a contract. However, the rent may be free of charge. In a case where the golf course 4 has a contract with a communication carrier for a large number of portable communication terminals 1, and the communication carrier charges the golf course 4 for the communication fees caused by the portable communication terminals 1, the golf course can charge each individual user for the use of the portable communication terminal 1 and an estimated communication fee.

In FIG. 15, the service such as advice used by an individual user during a game, as well a the user ID, is maintained in the data center 2 as the number of packets transmitted and received between the individual user and the data center 2. In this system, the golf course 4 makes an inquiry at the time of the payment for the game, so that the data center 2 promptly notifies the golf course 4 of the estimation of the communication fee based on the number of packets. Referring to the estimation of the communication fee, the golf course 4 charges the individual user for the communication fee. Alternatively, the portable communication terminal 1 is provided with a function of counting the number of packets, so that each individual user can be charged for the communication fee based on the number of packets in the portable communication terminal 1 at the time of the payment for the game.

The service charge rendered for the service provided by the data center 2 is paid by credit between each individual user and the data center 2. However, it is also possible to charge each individual user for the use and the communication fee of the portable communication terminal 1 and the service charge, as well as the play charge, at the time of payment at the golf course. In such a case, the payment from each individual user to the golf course may be settled by either cash or credit.

FIG. 15B shows a case where each individual user owns the portable communication terminal 1 as well as a portable telephone, and indicates the flow of the charges and service. In this case, each individual user has a contract with a communication carrier and with the data center 2 by initial registration. The golf course 4 has no concern with regard to the service charge of the individual user to the data center 2, and the communication fee for the communication carrier. Accordingly, the golf course 4 charges each individual user only for the play charge. Also, like the fee for a normal contract with a portable telephone, each individual user pays a communication fee caused by packet communication with the data center 2 by the month. As for the data center 2, a service is paid by credit or electronic settlement through the Internet.

The service charge may be a fixed fee per day or per round, or a flexible fee depending on the service such as advice provided by the data center 2, or a fee corresponding to the amount of data downloaded from the data center 2. At the end of a round, the data center 2 notifies the portable communication terminal 1 of a service charge, which is then displayed on the display unit of the portable communication terminal 1. Also, the reservation information of a plurality of golf courses is managed in the data center 2, so that a reservation that designates a golf course and a play date can be made through the portable communication terminal 1. In this case, a deposit can be paid by credit using a credit card number, as in the above-mentioned registration process. This service charge collecting unit can be formed by a combination of the process reception unit 21 and the authentication unit 22 in the data center 2 shown in FIG. 1.

FIG. 15C is a case where the portable combination terminal 1 is rented from the golf course 4, and the communication fee and the service charge are collected from the data center 2 at once. When the power source of the portable communication terminal 1 is switched on, a screen for inputting a user ID and a password is displayed on the screen. In accordance with the screen, the user ID and password registered in the user registration process are inputted, thereby accessing the data center 2. This access to the data center 2 is made by a free toll service provided by the data center 2. The communication carrier charges the data center 2 for packets used by each individual user in accordance with the terminal number. As the data center 2 manages data in accordance with terminal numbers and user IDs, the data center 2 can charge each individual user for the communication fee and service fee.

The present invention is not limited to the specifically disclosed embodiments, but variations and modifications may be made without departing from the scope of the present invention.

The present application is based on Japanese priority application No. 2000-203183, filed on Jul. 5, 2000, the entire contents of which are hereby incorporated by reference.

What is claimed is:

1. A golf data management system comprising:
   a portable communication terminal that is a portable telephone having a golf data management program stored therein; and
   a data center that transmits data to and receives data from the portable communication terminal via a communication network, wherein the portable communication terminal comprises:

a recording unit that records play data including a score and measurement data obtained by measuring a position of a shot or a putt by a measuring unit;

a transmission unit that adds an individual identification number of a player who carries the portable communication terminal to the play data recorded by the recording unit, and transmits the play data to the data center via the communication network after holing out of each hole; and a display unit that stores the data transmitted from the data center via the communication network, and displays the stored data, and the data center comprises:

an individual data storage unit that stores and manages practice result data and the play data corresponding to the individual identification number in accordance with each golf course and each play date;

a common data storage unit that stores course map data of a plurality of golf courses; and an output unit that outputs the play data stored in the individual data storage unit in response to a request from the portable communication terminal, wherein said portable communication terminal is carried by each player and is connectable to an input device separate from said portable communication terminal via a signal line, infrared signal or radio-frequency signal, and is configured to receive at least a portion of the play data from the input device, the input device having input buttons including a shot button a putt button, and a penalty button.

2. The golf data management system as claimed in claim 1, wherein the data center further comprises a first output unit that receives an advice request including the measurement data obtained by the measurement unit from the portable communication terminal and the individual identification number of the player added to the measurement data, and produces and transmits individual advice for the player, based on the data accompanied by the individual identification number stored in the individual data storage unit, the course map data stored in the common data storage unit, and a current location on a course map according to the measurement data.

3. The golf data management system as claimed in claim 2, wherein the data center further comprises a second output unit that judges the performance of the player by comparing a ratio of the number of failed shots to the total number of shots based on the play data stored in the individual data storage unit, and produces and outputs, in response to the advice request, individual advice for the player based on play data and practice data stored in the individual data storage unit in accordance with a judgment result of the performance.

4. The golf data management system as claimed in claim 1, wherein the portable communication terminal comprises:

a recording part that records measurement data obtained by the measurement unit when an input button on the input device is pressed at a location of a shot or a putt; and a communication part that adds an uploading header to the play data recorded by the recording part when a holed-out button on the input device is pressed at a time of sinking a ball in cup, and transmits the play data with the uploading header to the data center via the communication network, and the data center stores the play data and practice data obtained during a practice in the individual data storage unit in accordance with the uploading header.

5. The golf data management system as claimed in claim 1, wherein the data center comprises a group data storage unit that manages data on performance of a sub-group in which each member carries the portable communication terminal, and a distribution processing unit that distributes the play data from the individual storage unit to each portable communication terminal of the sub-group when it is determined that all members of the sub-group have holed out.

6. The golf data management system as claimed in claim 5, further comprising a unit that registers the sub-group in the group data storage unit based on the measurement data of a specific player's location obtained when a shot button is pressed by each member of the subgroup prior to making a tee shot.

7. The golf data management system as claimed in claim 1, wherein the data center is configured to receive recording data provided with individual data of hole-outs at a same location within a predetermined period of time, to determine that the recording data is data of one or more accompanying players, and to set group data for a group based on the individual data, and scores of all players of the group are transmitted to the portable communication terminal of each of the players based on the individual identification number of each of the players.

8. A method of managing golf data of one or more individual players, which golf data is transmitted between a portable communication terminal carried by each of said one or more individual players and a data center via a communication network, wherein the portable communication terminal is a portable telephone having a golf data management program stored therein, said method comprising the steps of:

storing course map data of a plurality of golf courses in a common data storage unit;

transmitting play data or practice data to the portable communication terminal from an input device separate from said portable communication terminal wherein said input device having input buttons including a shot button, a putt button, and a penalty button is connectable to the portable communication terminal via a signal line, infrared signal or radio frequency signal;

receiving the play data including measurement data and a score provided with an individual identification number supplied from the portable communication terminal, or the practice data provided with the individual identification number;

storing and managing the received data in an area corresponding to the individual identification number in an individual data storage unit;

reading out the course map data from the common data storage unit or the play data corresponding to the individual identification number from the individual data storage unit, in response to a course map data request or a play data request provided with the individual identification number supplied from the portable communication terminal; and transmitting the read-out course map data or the play data to the portable communication terminal.

9. The method as claimed in claim 8, further comprising the steps of:

determining a current location on the course map according to the measurement data, in response to an advice request provided with the individual identification number and the measurement data supplied from the portable communication terminal;

producing advice data on choice of a golf club or a shot at the current location based on the play data and the practice data corresponding to the individual identification number stored in the individual data storage unit; and transmitting the advice data to the portable communication terminal that has issued the advice request.

10. The method as claimed in claim 9, further comprising the steps of:

determining the current location on the course map according to the measurement data in response to an advice request provided with the individual identification number and the measurement data supplied from the portable communication terminal;

analyzing the play data and the practice data corresponding to the individual identification number stored and managed by the individual data storage unit;

producing the advice data on the choice of golf clubs and shots based on performance data obtained from a filed shot ratio, shot distance data of each golf club, and target distance data; and transmitting the advice data to the portable communication terminal that has issued the advice request.

11. The method as claimed in claim 9, further comprising the steps of:

storing and managing the individual identification number and data on performance of each of players that constitute a sub-group or a group made up of a plurality of sub-groups in a group data storage unit;

reading out the play data of each member in the sub-group from the individual data storage unit when it is determined that all members in the sub-group have holed out; and distributing the read-out play data to each of the members in the sub-group.

12. The method as claimed in claim 9, further comprising the steps of:

transmitting the course map data of the plurality of golf courses from the common storage unit in response to a request from the portable communication terminal; and charging the portable communication terminal with a fixed amount of money or a service charge corresponding to the amount of provided data when the data stored in the individual data storage unit and advice data on the play are transmitted in response to a request from the portable communication terminal.

13. The method as claimed in claim 12, further comprising the steps of:

lending the terminal portable communication terminal to a player;

registering the player in the data center using the portable communication terminal;

transmitting the play data from the portable communication terminal to the data center;

storing and managing the play data in the individual data storage unit;

transmitting course map data or advice data in response to a service request supplied from the portable communication terminal; and charging the player with a service charge for the service rendered in response to the service request.

* * * * *